(12) United States Patent
Kasabov

(10) Patent No.: US 7,089,217 B2
(45) Date of Patent: Aug. 8, 2006

(54) ADAPTIVE LEARNING SYSTEM AND METHOD

(75) Inventor: Nikola Kirilov Kasabov, Auckland (NZ)

(73) Assignee: Pacific Edge Biotechnology Limited, Dunedin (NZ)

(*) Notice: Subject to any disclaimer, the term of this patent is extended or adjusted under 35 U.S.C. 154(b) by 623 days.

(21) Appl. No.: 10/257,214

(22) PCT Filed: Apr. 10, 2001

(86) PCT No.: PCT/NZ01/00059

§ 371 (c)(1),
(2), (4) Date: Jan. 23, 2003

(87) PCT Pub. No.: WO01/78003

PCT Pub. Date: Oct. 18, 2001

(65) Prior Publication Data

US 2003/0149676 A1    Aug. 7, 2003

(30) Foreign Application Priority Data

Apr. 10, 2000 (NZ) .................................. 503882

(51) Int. Cl.
*G06F 15/18* (2006.01)
*G06F 17/00* (2006.01)

(52) U.S. Cl. .......................................... 706/12; 706/14
(58) Field of Classification Search .................. 706/2, 706/14
See application file for complete search history.

(56) References Cited

U.S. PATENT DOCUMENTS

| | | | |
|---|---|---|---|
| 5,251,283 A | 10/1993 | Honis ........................... 704/200 |
| 5,398,302 A | 3/1995 | Thrift ............................ 706/25 |
| 5,579,439 A * | 11/1996 | Khan ............................... 706/2 |
| 5,606,646 A * | 2/1997 | Khan et al. ..................... 706/2 |
| 5,714,866 A * | 2/1998 | S et al. ......................... 320/152 |
| 5,828,812 A * | 10/1998 | Khan et al. ..................... 706/2 |
| 5,963,899 A | 10/1999 | Bayya .......................... 704/226 |
| 6,016,486 A | 1/2000 | Nichols ........................ 706/47 |
| 6,018,731 A | 1/2000 | Bertrand et al. .............. 706/47 |
| 6,029,159 A | 2/2000 | Zorba et al. .................. 706/47 |

FOREIGN PATENT DOCUMENTS

EP    0 743 604 A1    11/1996
WO   WO 94/22074     9/1994

OTHER PUBLICATIONS

Kasabov et al, "Rule Insertion and Rule Extraction from Evolving Fuzzy Networks: Algorithms and Applications for Building Adaptive, Intelligent Expert Systems", IEEE Proceedings of the International Fuzzy Systems Conference. Aug. 1999.*

(Continued)

*Primary Examiner*—George Davis
(74) *Attorney, Agent, or Firm*—Finnegan, Henderson, Farabow, Garrett & Dunner, L.L.P.

(57) ABSTRACT

A neural network module including an input layer having one or more input nodes arranged to receive input data, a rule base layer having one or more rule nodes, an output layer having one or more output nodes, and an adaptive component arranged to aggregate selected two or more rule nodes in the rule base layer based on the input data, an adaptive learning system having one or more of the neural network modules, related methods of implementing the neural network module and an adaptive learning system, and a neural network program.

36 Claims, 22 Drawing Sheets

OTHER PUBLICATIONS

Yao et al, "A fuzzy Neural Network Model with Three-Layered Structure", IEEE International Conference on Fuzzy Systems Mar. 1995.*

Chaplin et al, "Towards the Use of Problem Knowledge in Training Neural Networks for Image Processing Tasks", IEE Image Processing and its Applications Conference, 1999.*

NIBs Pte Ltd Technical Report TR-960308, "NeuroFuzzy Computing", http://www.singaporegateway.com/products/nfga/neufuzzy.htm, 1999.*

Purvis et al, "Neuro-Fuzzy Methods for Environmental Modeling", University of Otago, Dec. 1998.*

Kasabov et al, FuNN—A Fuzzy Neyral Network Architecture for Adaptive Learning and Knowledge Acquisition, University of Otago, 1997.*

Nishina et al, "Fuzzy Inference Neural Networks Which Automatically Partition a Pattern Space and Extract Fuzzy If-Then Rules", IEEE Proceedings of the World Congress on Computational Intelligence Conference, Jun. 1994.*

Saman K. Halgamuge, "Self-Evolving Neural Networks for Rule-Based Data Processing", IEEE Transactions on Signal Processing, Nov. 1997.*

Nikola Kasabov, "Dynamic Evolving Fuzzy Neural Networks with 'm-out-of-n' Activation Nodes for On-line Adaptive Systems[1]," Dept. of Information Science, University of Otago, Dunedin, New Zealand, Published May 20, 1999.

* cited by examiner

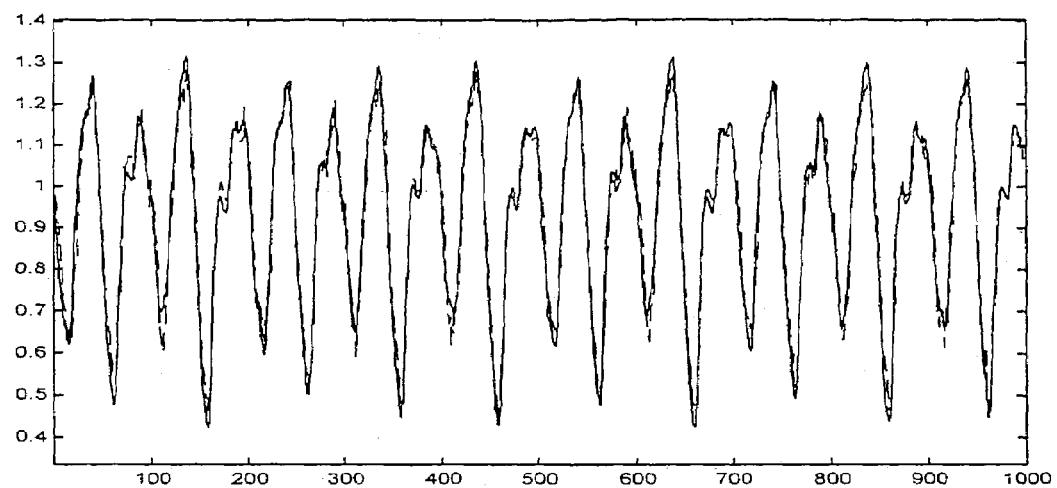
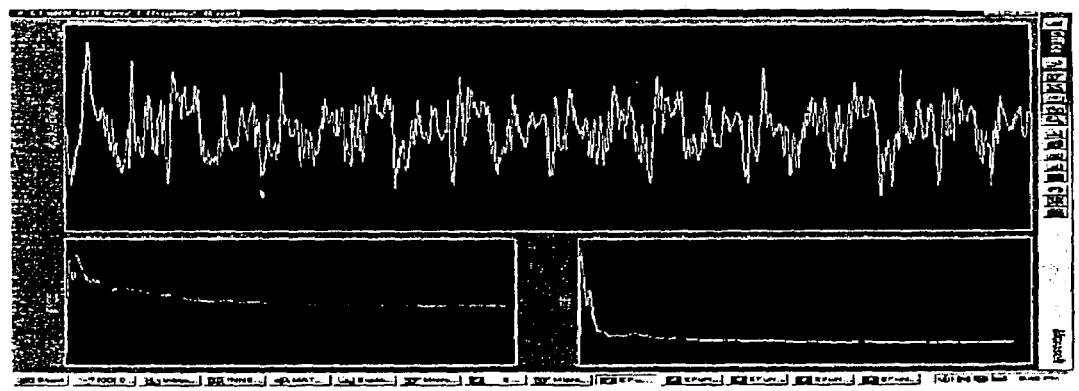
FIGURE 18A

```
Rule 1: if [x1 is (3 0.658) AND [x2 is (4 0.884)] AND [x3 is (4
0.822)] AND
         [x4 is (4 0.722)] [Radius of the receptive field R1 =
0.086]
         then  [y is (4 0.747)[accommodated training examples Nex(r1)=
6]

Rule 2: if [x1 is (3 0.511)] AND [x2 is (4 0.774)] AND [x3 is (4
0.852)] AND
         [x4 is (4 0.825)] [Radius of the receptive field R2 =
0.179]
         then   [y is (3 0.913)][accommodated training examples
Nex(r2)=2]
.....................

Rule 16: if [x1 is (2 0.532)]AND [x2 is (2 0.810)] AND [x3 is (3
0.783)] AND
         [x4 is(4 0.928)] [Radius of the receptive field R16 =
0.073)
         then  [y is (5 0.516)] [accommodated training examples
Nex(r16)=12]
```

Notation: The fuzzy values are denoted with numbers as follows: 1- very small, 2- small, 3-medium, 4 – large, 5 – very large; the antecedent and the consequent weights are rounded to the third digit after the decimal point; smaller values than 0.5 are ignored as 0.5 is used as a threshold T1 and T2 for rule extraction)

FIGURE 19

| Model | Parameter values | Number of centers (rule nodes in EFuNN) | On-line LNDEI after learning 3000 examples |
|---|---|---|---|
| RAN (Platt) | $\varepsilon = 0.01$ | 113 | 0.373 |
| RAN-GRD (Rosipal) | $\varepsilon = 0.01$ | 50 | 0.165 |
| RAN-P-GQRD (Rosipal) | $\varepsilon = 0.02$ | 31 | 0.160 |
| System-su | $E = 0.05, Rmax = 0.2$ | 91 | 0.115 |
| System-dp | $E = 0.05; Rmax = 0.2$ | 93 | 0.113 |

FIGURE 25

| Method \ Error | Global test classification accuracy (off-line) | Local test classification accuracy (on-line) |
|---|---|---|
| LVQ | 57% | N/A |
| System-s/u | 77% | 86.6% |

FIGURE 26

```
R1:  If -----C--C-C-TCC-G--CTC-GT-C---GGTGAGTG--GGC---C---G-GG-C--CC-
     Then [EI]
     Receptive field =0.216
     Max rdius =0.628
     Accommodated training examples =26/1000
```

FIGURE 27

R1: IF [g1](2 0.9) and [g3](2 0.9) and [g5](2 0.7) and [g6](2 0.7) and [g8](1 0.8) and [g9](2 0.7)
   {radius of the receptive field = 0.109 }
   THEN Class ALL of Leukemia {accommodated training examples = 47/72}

Note: Extracted rule from a trained system on micro-array gene expression data: [g1] (2 0.9) means that the membership degree to which gene 1 expression value belongs to the membership function "High" is 0.9.

FIGURE 28

ADAPTIVE LEARNING SYSTEM AND METHOD

FIELD OF INVENTION

The invention relates to an adaptive learning system and method and in particular relates to a neural network module forming part of an adaptive learning system.

BACKGROUND TO INVENTION

Real world problems, such as massive biological data analysis and knowledge discovery, adaptive speech recognition and life-long language acquisition, adaptive intelligent prediction and control systems, intelligent agent-based systems and adaptive agents on the Web, mobile robots, visual monitoring systems, multi-modal information processing, intelligent adaptive decision support systems, adaptive domestic appliances and intelligent buildings, systems that learn and control brain and body states from a biofeedback, systems which classify bio-informatic data, and other systems require sophisticated solutions for building on-line adaptive knowledge base systems.

Such systems should be able to learn quickly from a large amount of data, adapt incrementally in an on-line mode, have an open structure so as to allow dynamic creation of new modules, memorise information that can be used later, interact continuously with the environment in a "life-long" learning mode, deal with knowledge as well as with data, and adequately represent space and time in their structure.

Well established neural network and artificial intelligence (AI) techniques have difficulties when applied for on-line knowledge based learning. For example, multi-layer perceptrons (MLP) and backpropagation learning algorithms have a number of problems, for example catastrophic forgetting, local minima problem, difficulties in extracting rules, inability to adapt to new data without retraining on old data, and excessive training times when applied to large data sets.

The self-organising map (SOM) may not be efficient when applied for unsupervised adaptive learning on new data, as the SOM assumes a fixed structure and a fixed grid of nodes connected in a topological output space that may not be appropriate to project a particular data set. Radial basis neural networks require clustering to be performed first and then the back propagation algorithm applied. Neuro-fuzzy systems cannot update the learned rules through continuous training on additional data without catastrophic forgetting.

These type of networks are not efficient for adaptive, on-line learning, although they do provide an improvement over prior techniques.

SUMMARY OF INVENTION

In one form the invention comprises a neural network module comprising an input layer comprising one or more input nodes arranged to receive input data; a rule base layer comprising one or more rule nodes; an output layer comprising one or more output nodes; and an adaptive component arranged to aggregate selected two or more rule nodes in the rule base layer based on the input data.

In another form the invention comprises a method of implementing a neural network module comprising the steps of arranging an input layer comprising one or more input nodes to receive input data; arranging a rule base layer comprising one or more rule nodes; arranging an output layer comprising one or more output nodes; and arranging an adaptive component to aggregate selected two or more rule nodes in the rule base layer based on the input data.

In a further form the invention comprises a neural network computer program comprising an input layer comprising one or more input nodes arranged to receive input data; a rule base layer comprising one or more rule nodes; an output layer comprising one or more output nodes; and an adaptive component arranged to aggregate selected two or more rule nodes in the rule base layer based on the input data.

BRIEF DESCRIPTION OF THE FIGURES

Preferred forms of the adaptive learning system and method will now be described with reference to the accompanying figures in which:

FIGS. 18A and 18B illustrate the system learning a complex time series chaotic function;

FIG. 19 is a table of selected rules extracted from a system trained on the function of FIG. 18;

FIG. 25 illustrates comparative analysis of the learning model of the system with other models;

FIG. 26 is a table showing global test accuracy of a known method compared with the system of the invention;

FIG. 27 illustrates a rule from a set of rules extracted from an evolved system from a sequence of biological data for the identification of a splice junction between introns and exons in a gene; and FIG. 28 illustrates a rule from a set of rules extracted from an evolved system from a micro-array gene expression data taken from two types—ALL and AML of leukaemia cancer tissues.

DETAILED DESCRIPTION OF PREFERRED FORMS

Figure 1:
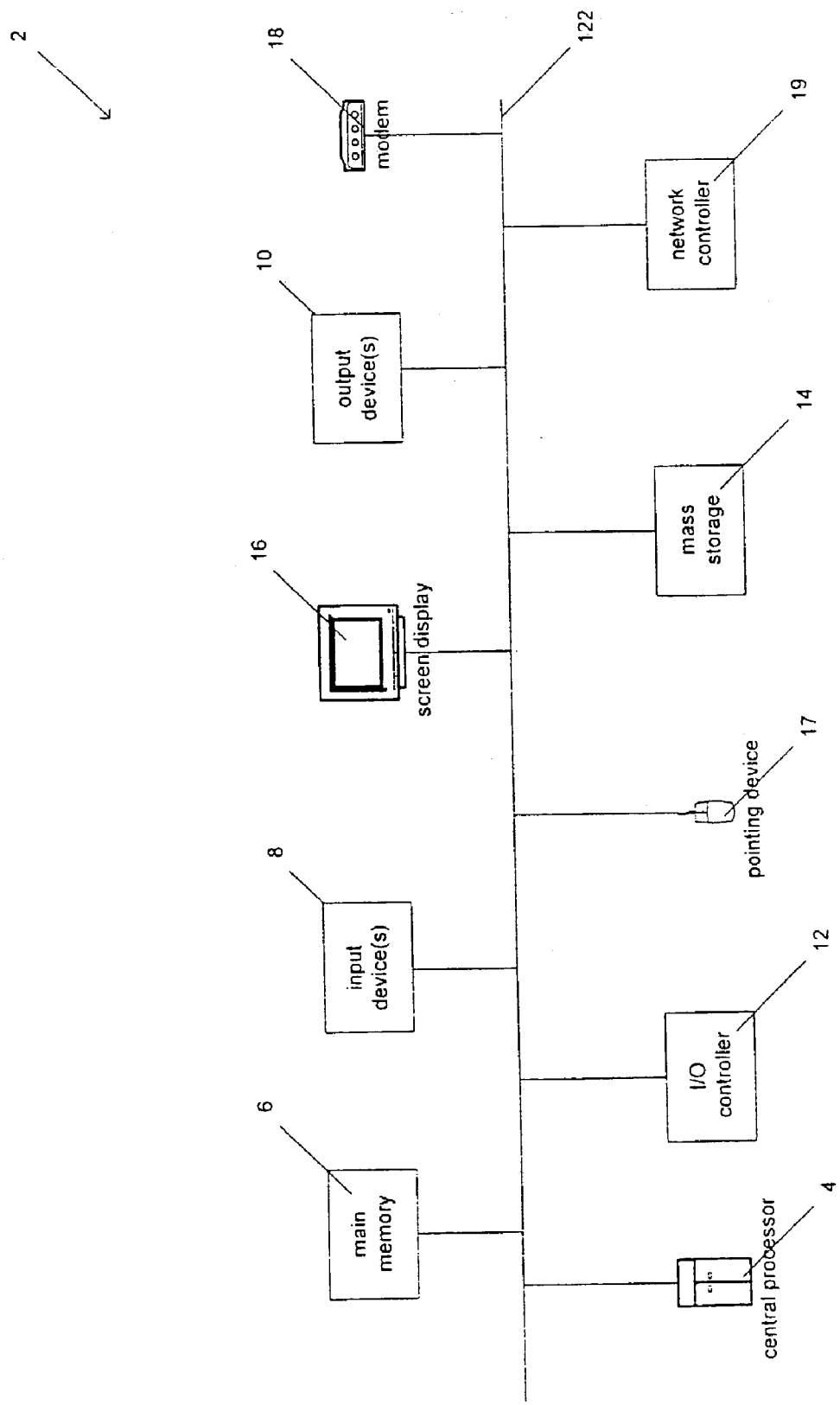
FIG. 1 is a schematic view of hardware on which one form of the invention may be implemented.

FIG. 1 illustrates preferred form hardware on which one form of the invention may be implemented. The preferred system 2 comprises a data processor 4 interfaced to a main memory 6, the processor 4 and the memory 6 operating under the control of appropriate operating and application software or hardware. The processor 4 could be interfaced to one or more input devices 8 and one or more output devices 10 with an I/O controller 12. The system 2 may further include suitable mass storage devices 14 for example, floppy, hard disk or CD Rom drives or DVD apparatus, a screen display 16, a pointing device 17, a modem 18 and/or network controller 19. The various components could be connected via a system bus or over a wired or wireless network.

In one form the invention could be arranged for use in speech recognition and to be trained on model speech signals. In this form, the input device(s) 8 could comprise a microphone and/or a further storage device in which audio signals or representations of audio signals are stored. The output device(s) 10 could comprise a printer for displaying the speech or language process by the system, and/or a suitable speaker for generating sound. Speech or language could also be displayed on display device 16.

Where the invention is arranged to classify bio-informatics case study data, this data could be stored in a mass storage device 14, accessed by the processor 4 and the results displayed on a screen display 16 and/or a further output device 10.

Where the system 2 is arranged for use with a mobile robot, the input device(s) 8 could include sensors or other apparatus arranged to form representations of an environment. The input devices could also include secondary storage in which a representation of an environment is stored. The output device(s) 10 could include a monitor or visual display unit to display the environment processed by the system. The processor 4 could also be interfaced to motor control means to transport the robot from one location in the processed environment to another location.

It will be appreciated that the adaptive learning system 2 could be arranged to operate in many different environments and to solve many different problems. In each case, the system 2 evolves its structure and functionality over time through interaction with the environment through the input devices 8 and the output devices 10.

Figure 2:
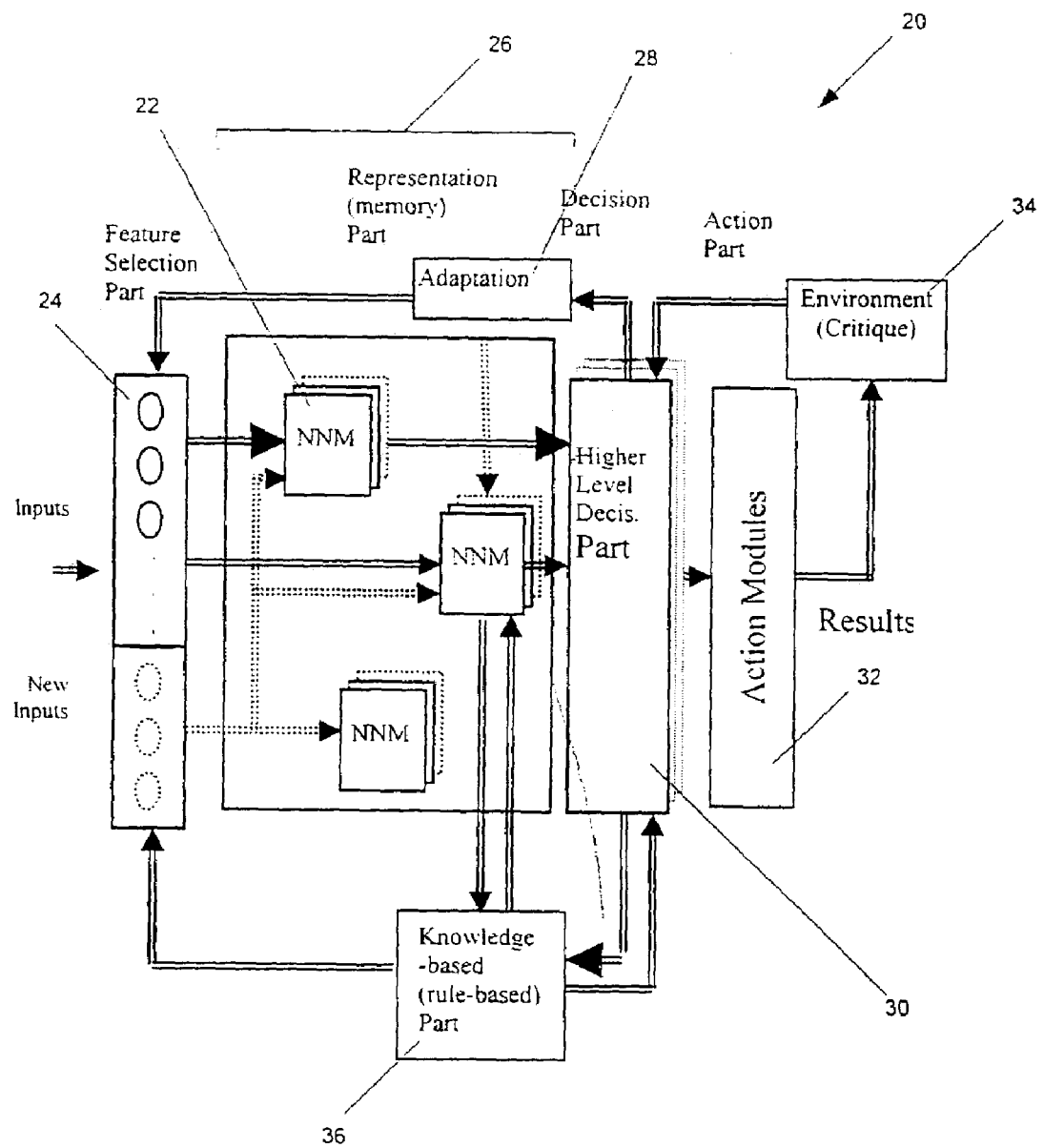
FIG. 2 is a further schematic view of an adaptive learning system of the invention.

FIG. 2 illustrates the computer-implemented aspects of the invention stored in memory 6 and/or mass storage 14 and arranged to operate with processor 4. The preferred system is arranged as an evolving connectionist system 20. The system 20 is provided with one or more neural network modules or NNM 22. The arrangement and operation of the neural network module(s) 22 forms the basis of the invention and will be further described below.

The system includes a representation or memory component 26 comprising one or more neural network modules 22. The representation component 26 preferably includes an adaptation component 28 as will be particularly described below which enables rule nodes to be inserted extracted and/or aggregated.

The system 20 may include a number of further known components, for example a feature selection component 24 arranged to perform filtering of the input information, feature extraction and forming the input vectors.

The system may also include a higher level decision component 30 comprising one or more modules which receive feedback from the environment 34, an action component 32 comprising one or more modules which take output values from the decision component and pass output information to the environment 34, and a knowledge base 36 which is arranged to extract compressed abstract information from the representation component 26 and the decision component 30 in the form of rules, abstract associations and other information. The knowledge base 36 may use techniques such as genetic algorithms or other evolutionary computation techniques to evaluate and optimise the parameters of the system during its operation.

Figure 3:
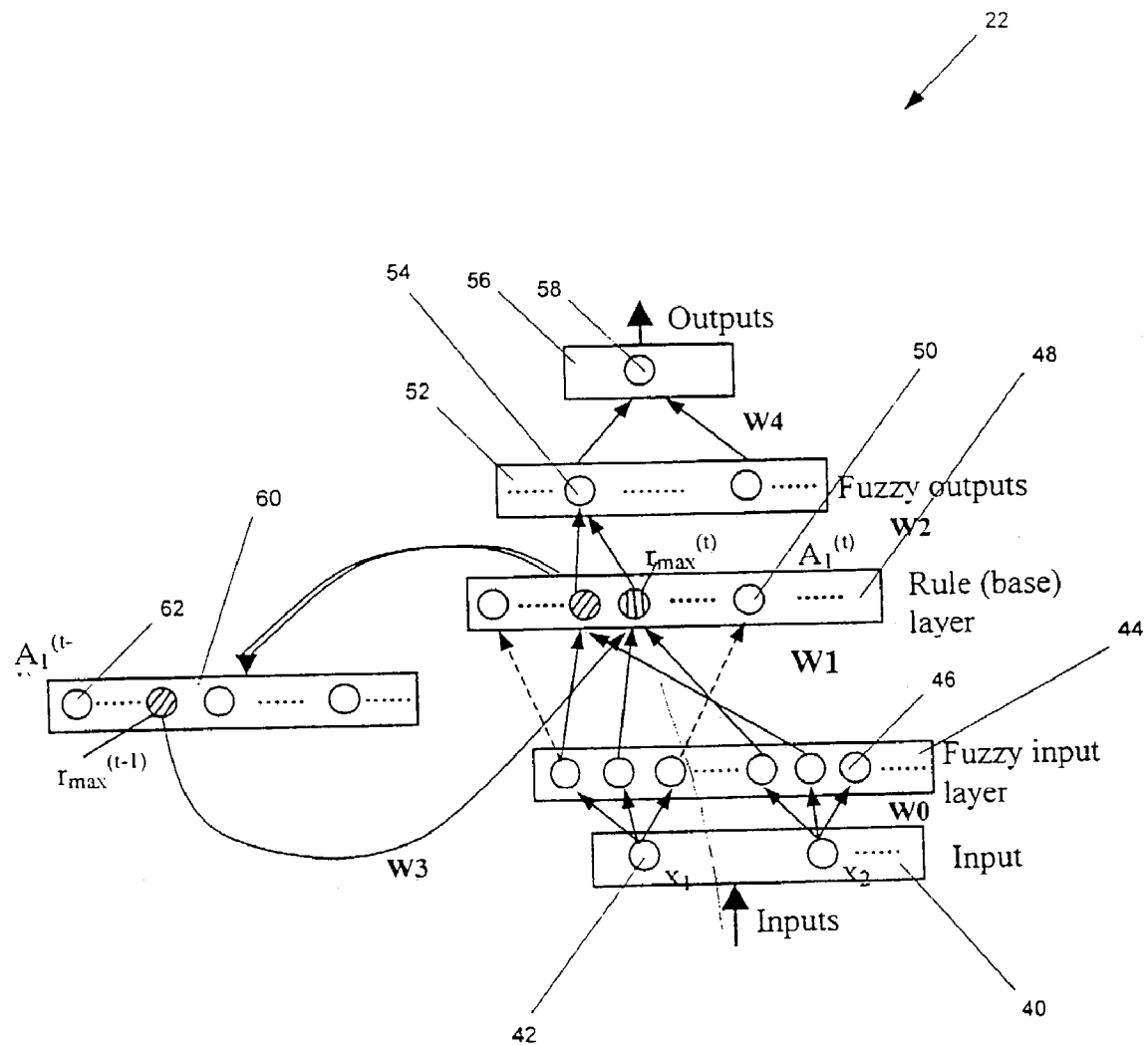
FIG. 3 is a schematic view of a neural network module of FIG. 2.

FIG. 3 illustrates one preferred form of neural network module 22. The preferred structure is a fuzzy neural network which is a connectionist structure which implements fuzzy rules. The neural network module 22 includes input layer 40 having one or more input nodes 42 arranged to receive input data.

Figure 4:
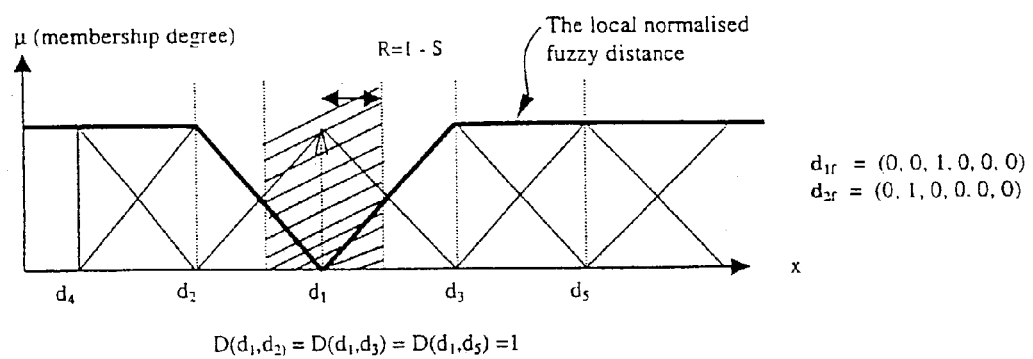
FIG. 4 is an example of membership functions for use with the invention.

The neural network module 22 may further comprise fuzzy input layer 44 having one or more fuzzy input nodes 46. The fuzzy input nodes 46 transform data from the input nodes 42 for the further use of the system. Each of the fuzzy input nodes 46 could have a different membership function attached to it. One example of a membership function is the triangular membership function shown in FIG. 4. The membership function could also include Gaussian functions or any other known functions suitable for the purpose. The system is preferably arranged so that the number and type of the membership function may be dynamically modified as will be described further below. The main purpose of the fuzzy input nodes 46 is to transform the input values from the input nodes 42 into membership degrees to which the values belong to the membership function.

The neural network module 22 further comprises rule base layer 48 having one or more rule nodes 50. Each rule node 50 is defined by two vectors of connection weights $W1(r)$ and $W2(r)$. Connection weight $W1(r)$ is preferably adjusted through unsupervised learning based on similarity measure within a local area of the problem space. $W2(r)$, on the other hand, is preferably adjusted through supervised learning based on output error, or on reinforcement learning based on output hints. Connection weights $W1(r)$ and $W2(r)$ are further described below.

The neural network module 22 may further comprise a fuzzy output layer 52 having one or more fuzzy output nodes 54. Each fuzzy node 54 represents a fuzzy quantisation of the output variables, similar to the fuzzy input nodes 46 of the fuzzy input layer 54. Preferably, a weighted sum input function and a saturated linear activation function are used for the nodes to calculate the membership degrees to which the output vector associated with the presented input vector belongs to each of the output membership functions.

The neural network module also includes output layer 56 having one or more output nodes 58. The output nodes 58 represent the real values of the output variables. Preferably a linear activation function is used to calculate the defuzzified values for the output variables.

The preferred form rule base layer 48 comprising one or more rule nodes 50 representing prototypes of input-output data associations that can be graphically represented as associations of hyper-spheres from the fuzzy input layer 44 spaces and the fuzzy output layer 52 spaces. Each rule node 50 has a minimum activation threshold which is preferably determined by a linear activation function.

As shown in FIG. 3, the neural network module 22 may also include a short-term memory layer 60 having one or more memory nodes 62. The purpose of the short-term memory layer 60 is to memorise structurally temporal relationships of the input data. The short-term memory layer is preferably arranged to receive information from and send information to the rule base layer 48.

Figure 5:
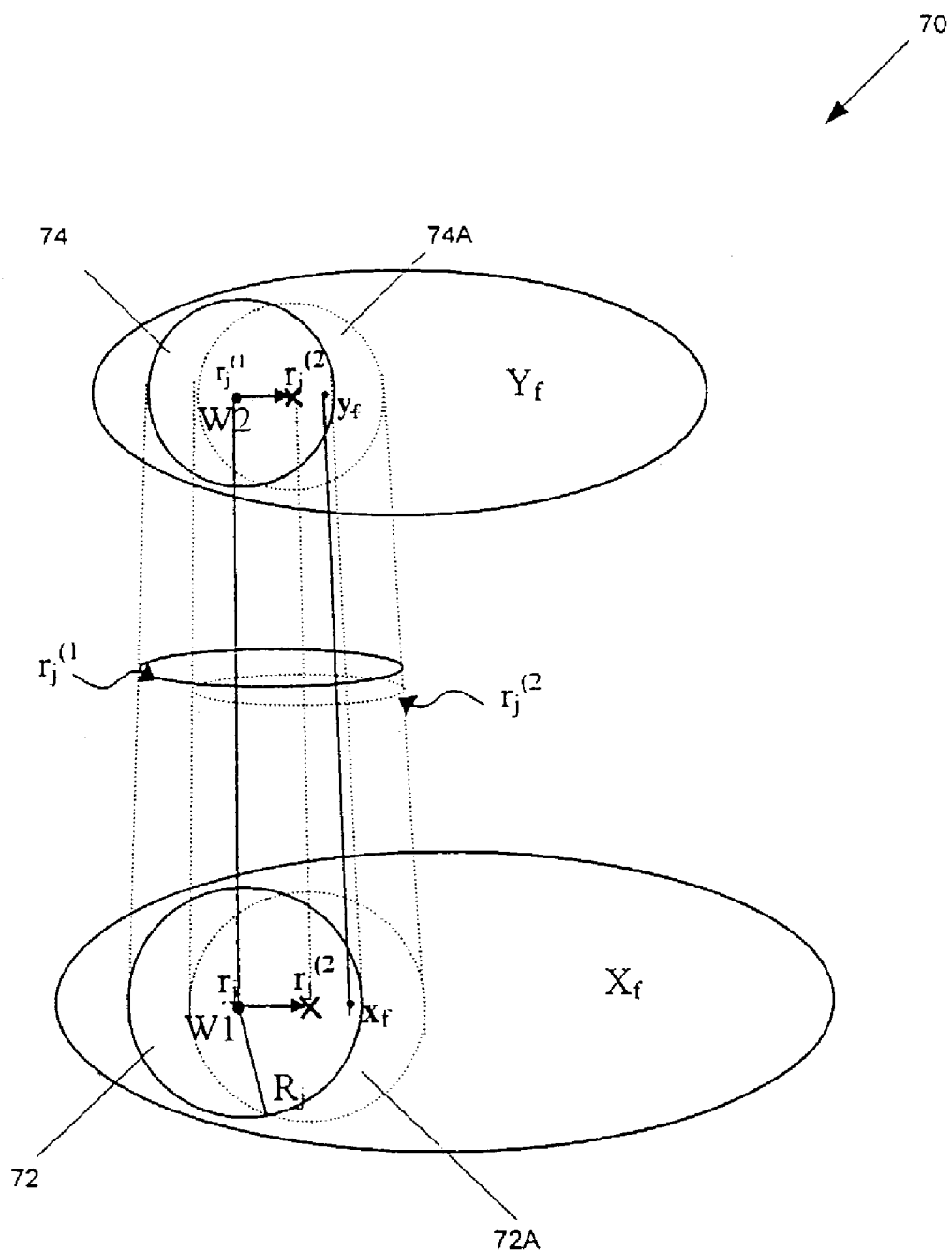
FIG. 5 is an example of a rule mode of the invention.

As described above, each rule node 50 represents an association between a hyper-sphere from the fuzzy input space and a hyper-sphere from the fuzzy output space. These spheres are described with reference to FIG. 5, which illustrates example rule node 70 shown as $r_j$. Rule node $r_j$ has an initial hyper-sphere 72 in the fuzzy input space. The rule node $r_j$ has a sensitivity threshold parameter $S_j$ which defines the minimum activation threshold of the rule node $r_j$ to a new input vector x from a new example or input (x,y) in order for the example to be considered for association with this rule node. A new input vector x activates a rule node if x satifies the minimum actuation threshold and is subsequently considered for association with the rule node. The radius of the input hyper-sphere 72 is defined as $R_j=1-S_j$, $S_j$ being the sensitivity threshold parameter.

Rule node $r_j$ has a matrix of connection weights W1 ($r_j$) which represents the coordinates of the centre of the sphere 72 in the fuzzy input space. Rule node $r_j$ also has a fuzzy output space hyper-sphere 74, the coordinates of the centre of the sphere 74 being connection weights W2 ($r_j$). The radius of the output hyper-sphere 74 is defined as E which represents the error threshold or error tolerance of the rule node 70. In this way it is possible for some rule nodes to be activated more strongly than other rule nodes by input data.

A new pair of data vectors (x,y) is transformed to fuzzy input/output data vectors ($x_f$, $y_f$) which will be allocated to the rule node 70 if $x_f$ falls within input hyper-sphere 72 and $y_f$ falls within the output hyper-sphere 74 when the input vector x is propagated through the input node. The distance of $x_f$ from the centre of input hyper-sphere 72 and the distance of $y_f$ from the centre of output hyper-sphere 74 provides a basis for calculating and assigning the magnitude or strength of activation. This strength of activation provides a basis for comparing the strengths of activation of different rule nodes. Therefore a further basis for allocation is where the rule node 70 receives the strongest activation among other rule nodes. The data vectors ($x_f$, $y_f$) will be associated with rule node 70 if the local normalised fuzzy difference between $x_f$ and W1 ($r_j$) is smaller than the radius $R_j$, and the normalised output error Err=||y-y'||/Nout is smaller than an error threshold E, Nout is the number of the outputs and y' is produced by the system output. The E parameter sets the error tolerance of the system.

In the preferred method a local normalised fuzzy difference (distance) between two fuzzy membership vectors $d_{1f}$ and $d_{2f}$ that represent the membership degrees to which two real vector data $d_1$ and $d_2$ belong to pre-defined MFs, is calculated as:

$$D(d_{1f}, d_{2f}) = \|d_{1f} - d_{2f}\| / \|d_{1f} + d_{2f}\| \tag{1}$$

where: ||x-y|| denotes the sum of all the absolute values of a vector that is obtained after vector subtraction (or summation in case of ||x+y||) of two vectors x and y; "/" denotes division. For example, if $d_{1f}$=(0, 0, 1, 0, 0, 0) and $d_{2f}$=(0, 1, 0, 0, 0, 0), then D($d_1$, $d_2$)=(1+1)/2=1 which is the maximum value for the local normalised fuzzy difference.

As new inputs are fed to rule node 70, these data inputs relevant to $r_j$ may be associated with rule node 70 providing an opportunity for learning. As new fuzzy input/output data vector ($x_f$, $y_f$) is fed to the rule node 70, the centre of the input hyper-sphere 72 is adjusted to a new sphere indicated at 72A by adjusting W1 ($r_j^{(1)}$) to W1 ($r_j^{(2)}$). The output hyper-sphere 74 is also adjusted to new sphere as shown at 74A by adjusting W2 ($r_j^{(1)}$) to W2 ($r_j^{(2)}$).

The centres of the node hyper-spheres are adjusted in the fuzzy input space depending on the distance between the new input vector and the rule node through a learning rate $l_j$, a parameter that is individually adjusted for each rule node. The adjustment of the hyper-spheres in the fuzzy output space depends on the output error and also on the learning rate $l_j$ through the Widrow-Hoff LMS algorithm, also called the Delta algorithm.

This adjustment in the input and in the output spaces can be represented mathematically by the change in the connection weights of the rule node $r_j$ from W1($r_j^{(1)}$) and W2($r_j^{(1)}$) to W1($r_j^{(2)}$) and W2($r_j^{(2)}$) respectively according to the following vector operations:

$$W1(r_j^{(2)}) = W1(r_j^{(1)}) + l_j \cdot (W1(r_j^{(1)}) - x_f) \tag{2}$$

$$W2(r_j^{(2)}) = W2(r_j^{(1)}) + l_j \cdot (A2 - y_f) \cdot A1(r_j^{(1)}) \tag{3}$$

where: $A2=f_2(W2.A1)$ is the activation vector of the fuzzy output neurons when the input vector x is presented; $A1(r_j^{(1)})=f1(D(W1(r_j^{(1)}),x_f))$ is the activation of the rule node $r_j^{(1)}$; a simple linear function can be used for $f_1$ and $f_2$, e.g. $A1(r_j^{(1)})=1-D(W1(r_j^{(1)}),x_f)$, where D is the fuzzy normalised distance measure; $l_j$ is the current learning rate of the rule node $r_j$ calculated as $l_j=1/Nex(r_j)$, where $Nex(r_j)$ is the number of examples currently associated with rule node $r_j$. The statistical rationale behind this is that the more examples that are currently associated with a rule node the less it will "move" when a new example has to be accommodated by this rule node, i.e. the change in the rule node position is proportional to the number of already associated examples which is a statistical characteristic of the method.

When a new example is associated with a rule node $r_j$ not only its location in the input space changes, but also its receptive field expressed as its radius Rj, and its sensitivity threshold Sj:

$$R_j^{(2)} = R_j^{(1)} + D(W1(r_j^{(2)}), W1(r_j^{(1)})), R_j^{(2)} \leq Rmax \tag{4}$$

respectively (3)

$$S_j^{(2)} = S_j^{(1)} - D(W1(r_j^{(2)}), W1(r_j^{(1)})) \tag{5}$$

where Rmax is a parameter set to restrict the maximum radius of the receptive field of a rule node.

Figure 6:
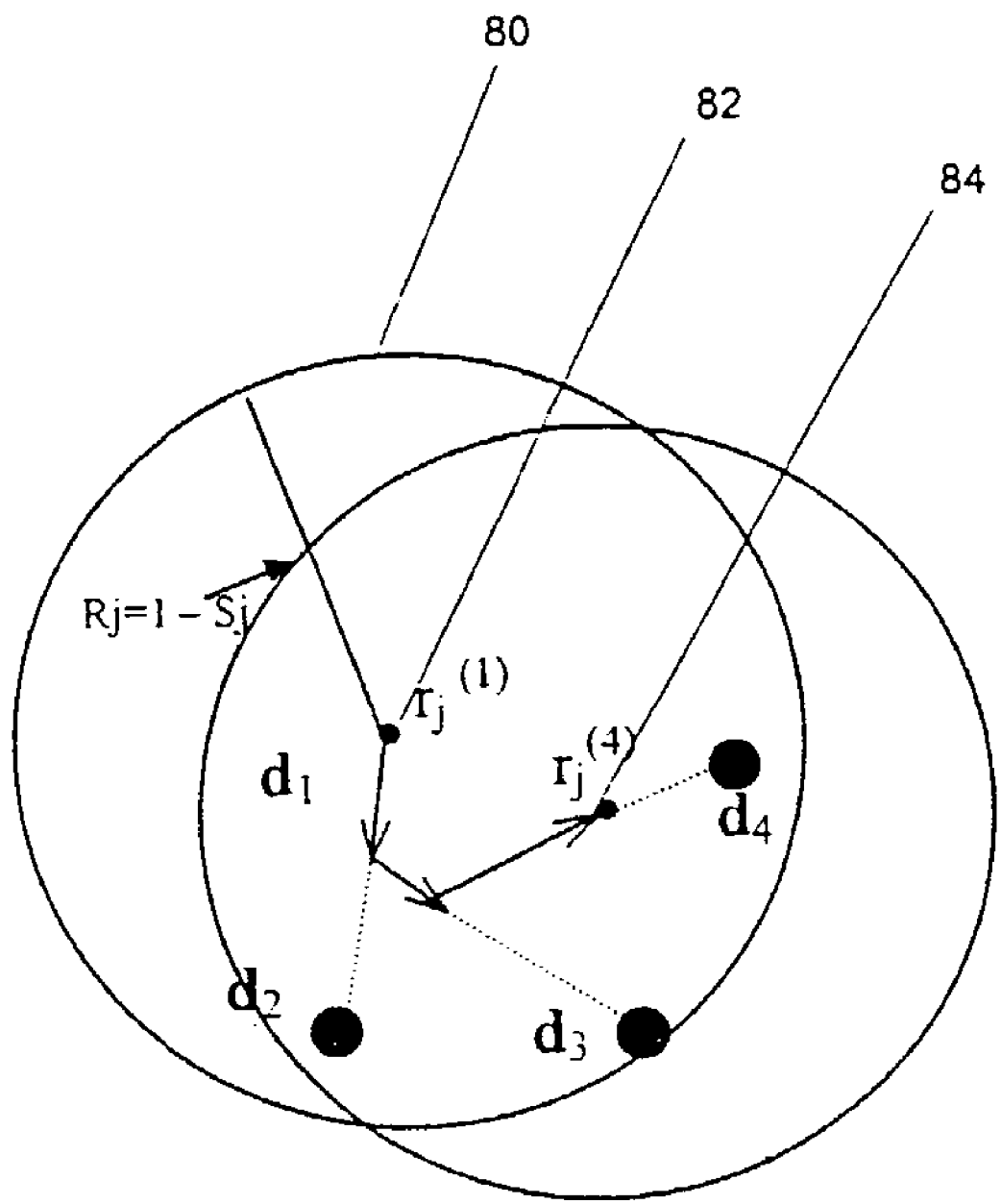
FIG. 6 illustrates the adjustment and learning process relating to the rule node of FIG. 5.

The adjustment and learning process in the fuzzy input space is illustrated in FIG. 6 which schematically illustrates how the centre $r_j^{(1)}$ 82 of the rule node $r_j$ 80 adjusts, after learning each new data point, to its new position $r_j^{(4)}$ 84 based on one pass learning on the four data points $d_1$, $d_2$, $d_3$ and $d_4$.

The adaptation component of the preferred system enables rule nodes to be inserted, extracted and adapted or aggregated as will be described below. At any time or phase of the evolving or learning process, fuzzy or exact rules may be inserted by setting a new rule node $r_j$ for each new rule, such that the connection weights W1 ($r_j$) and W2 ($r_j$) of the rule node represent this rule.

For example, the fuzzy rule (IF $x_1$ is Small and $x_2$ is Small THEN y is Small) may be inserted into the neural network module 22 by setting the connections of a new rule node to the fuzzy condition nodes x1-Small and x2-Small and to the fuzzy output node y-Small to a value of 1 each. The rest of the connections are set to a value of 0.

Similarly, an exact rule may be inserted into the module 22, for example IF $x_1$ is 3.4 and $x_2$ is 6.7 THEN y is 9.5. Here, the membership degrees to which the input values $x_1=3.4$ and $x_2=6.7$ and the output value $y=9.5$ belong to the corresponding fuzzy values are calculated and attached to the corresponding connection weights.

The preferred adaptation component also permits rule extraction in which new rules and relationships are identified by the system. Each rule node $r_j$ can be expressed as a fuzzy rule, for example:

Rule r: IF $x_1$ is Small 0.85 and $x_1$ is Medium 0.15 and $x_2$ is Small 0.7 and $x_2$ is Medium 0.3 {radius of the receptive field of the rule r is 0.5}

THEN y is Small 0.2 and y is Large 0.8 {Nex(r) examples associated with this rule out of Nsum total examples learned by the system}.

The numbers attached to the fuzzy labels denote the degree to which the centres of the input and the output hyper-spheres belong to the respective membership functions.

Figure 8:
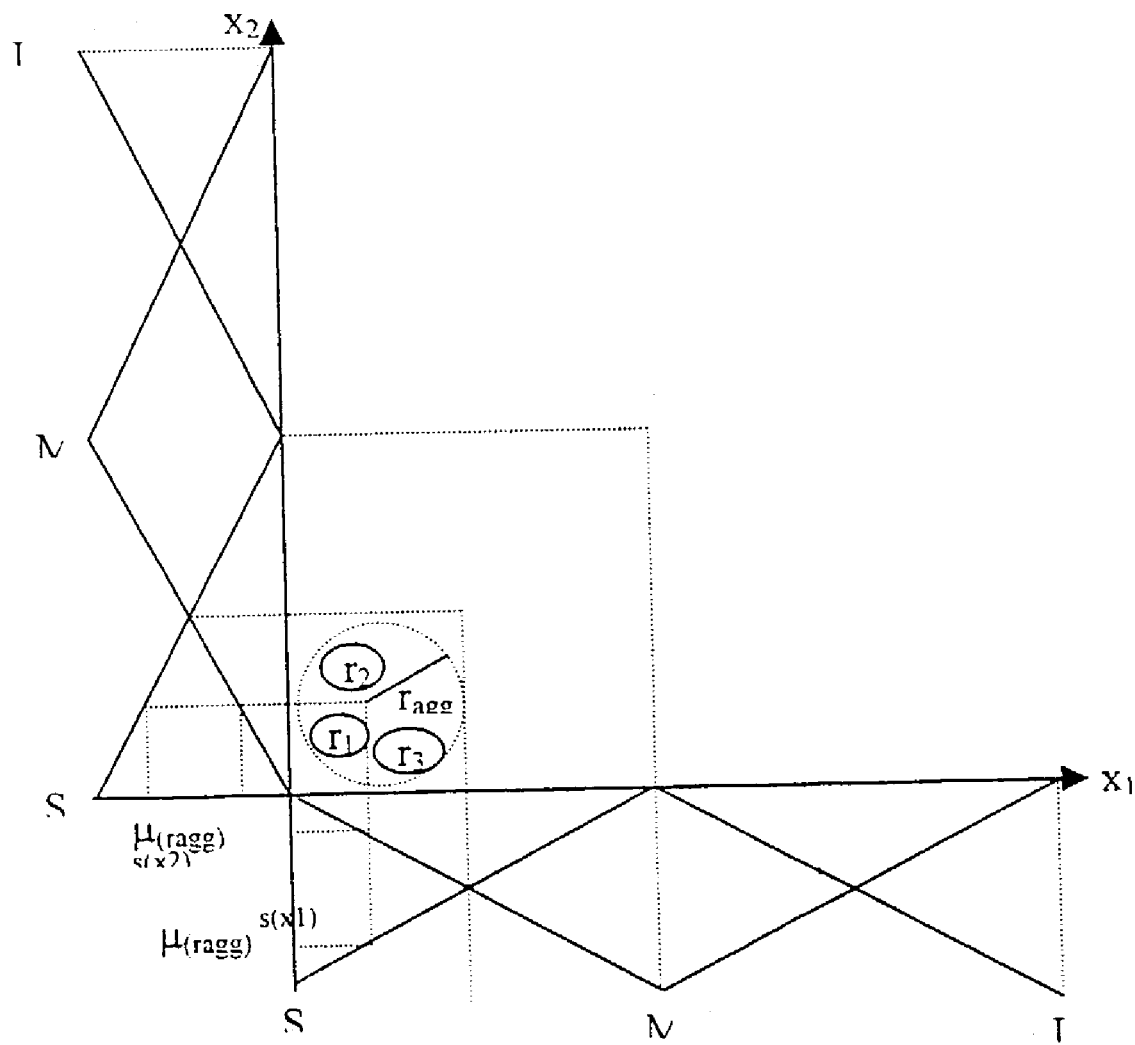
FIG. 8 shows one method of aggregating the rule nodes of FIG. 7.
Figure 9:
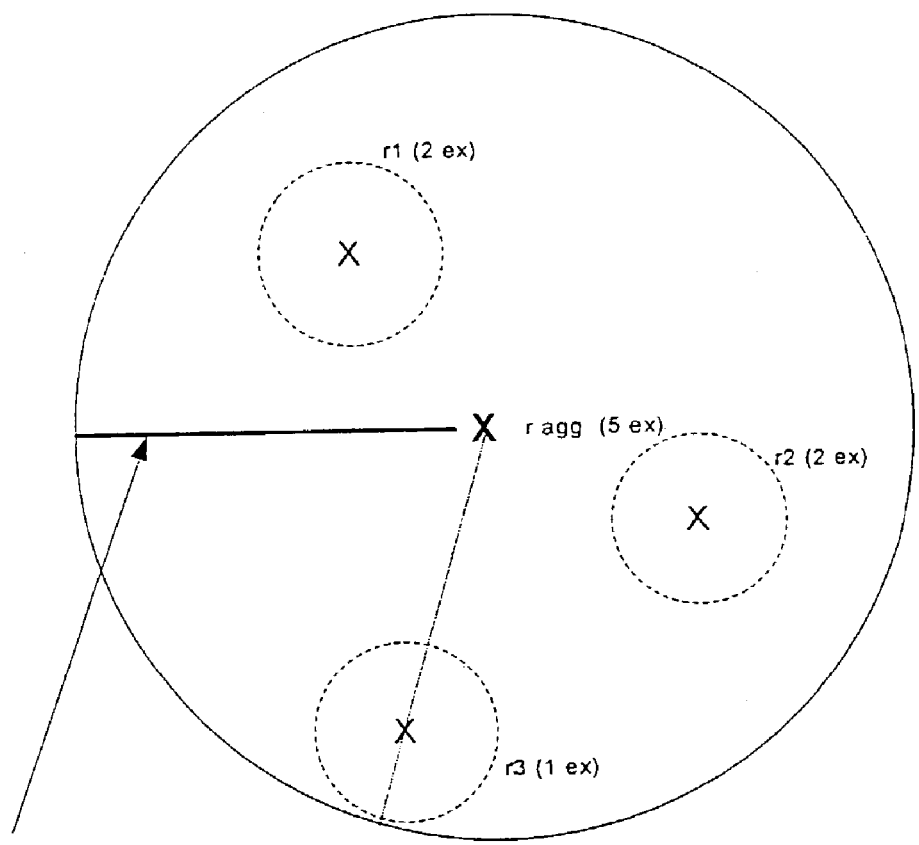
FIG. 9 illustrates another method of aggregating the three rule nodes of FIG. 7.

The adaptation component preferably also permits rule node aggregation. Through this technique, several rule nodes are merged into one as is shown in FIGS. 7, 8 and 9 on an example of 3 rule nodes $r_1$, $r_2$ and $r_3$.

Figure 7:
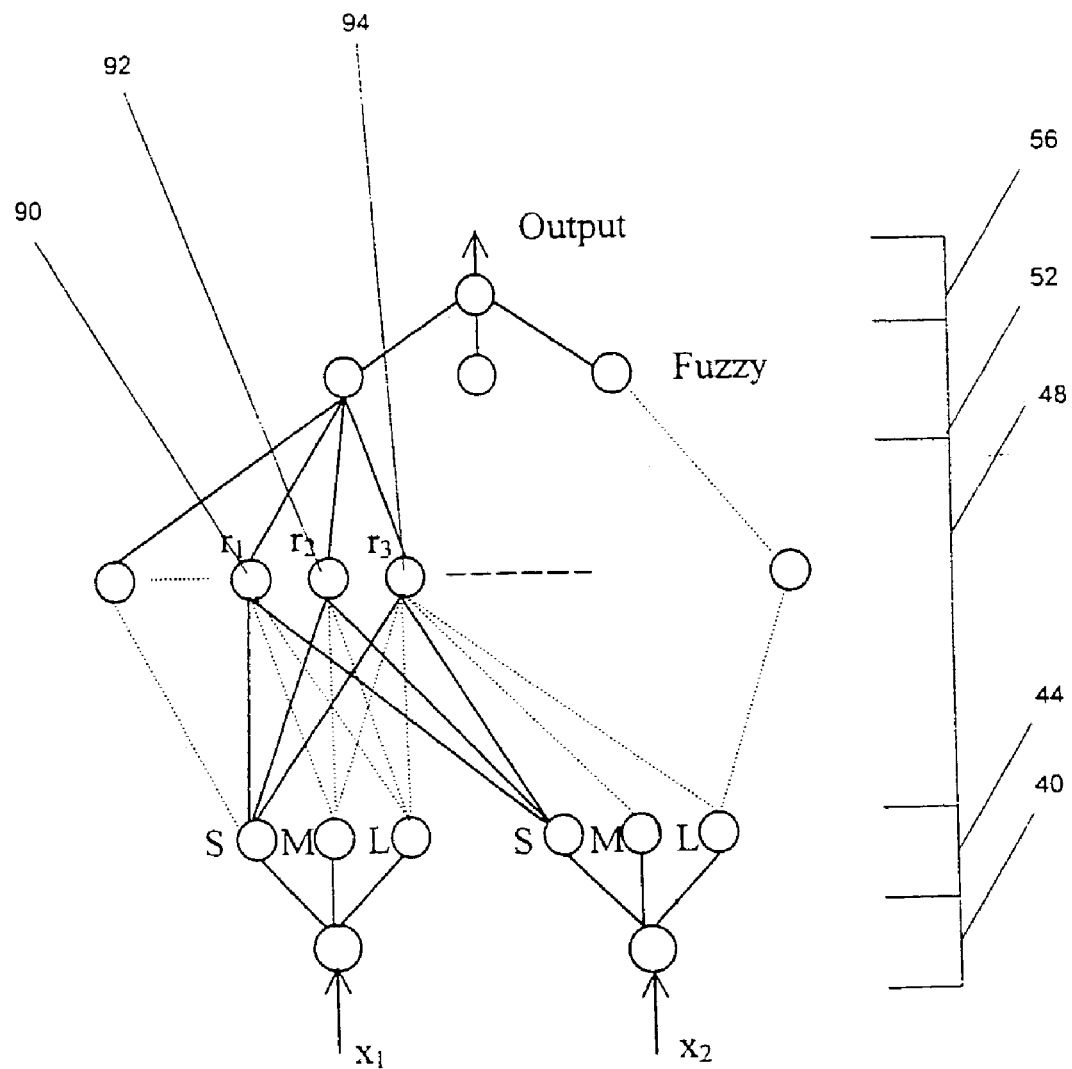
FIG. 7 shows an adaptive learning system of the invention having three rule nodes.

FIG. 7 illustrates a neural network module similar to the module of FIG. 3. The module may comprise, for example, an input layer 40, a fuzzy input layer 44, a rule base layer 48, a fuzzy output layer 52 and an output layer 56. The rule base layer 48 includes, for example, rule nodes $r_1$, $r_2$ and $r_3$ indicated at 90, 92 and 94 respectively.

For the aggregation of these three rule nodes $r_1$, $r_2$, and $r_3$ the following two aggregation strategies can be used to calculate the new aggregated rule node $r_{agg}$, W1 connections (the same formulae are used to calculate the W2 connections):

as a geometrical centre of the three nodes:

$$W1(r_{agg})=(W1(r_1)+W1(r_2)+W1(r_3))/3 \quad (6)$$

as a weighted statistical centre:

$$W1(r_{agg})=(W1(r_1).Nex(r_1)+W1(r_2). Nex(r_2)+W1(r_3). Nex(r_3))/Nsum \quad (7)$$

$$Nex(r_{agg})=Nsum=Nex(r_1)+Nex(r_2)+Nex(r_3); \quad (8)$$

$$Rr_{agg}=D(W1(r_{agg}), W1(r_j))+Rj<=\text{Rmax}; \quad (9)$$

where $r_j$ is the rule node from the three nodes that has a maximum distance from the new node $r_{agg}$ and Rj is its radius of the receptive field. The three rule nodes will aggregate only if the radius of the aggregated node receptive field is less than a pre-defined maximum radius Rmax.

FIG. 8 shows an example of aggregation as a geometrical centre of the three nodes whereas FIG. 9 shows aggregation as a weighted statistical centre.

In order for a given node $r_j$ to "choose" the other nodes with which it should aggregate, two subsets of nodes are formed—the subset of nodes $r_k$ that if activated to a degree of 1 will produce an output value $y'(r_k)$ that is different from $y'(r_j)$ in less than the error threshold E, and the subset of nodes that cause output values different from $y'(r_k)$ in more than the error threshold E. The W2 connections define these subsets. All the rule nodes from the first subset that are closer to $r_j$ in the input space than the closest to $r_j$ node from the second subset in terms of W1 distance, get aggregated if the calculated radius of the new node $r_{agg}$ is less than the pre-defined limit Rmax for a receptive field as illustrated on FIG. 9.

Instead of aggregating all the rule nodes that are closer to a rule node $r_j$ than the closest node from the other class, it is possible to keep the closest node from the aggregation pool to the other class out of the aggregation procedure—as a separate node—a "guard", as shown in FIGS. 10, 11, 12 and 13, thus preventing future misclassification on the bordering area between the two classes.

Figure 10:
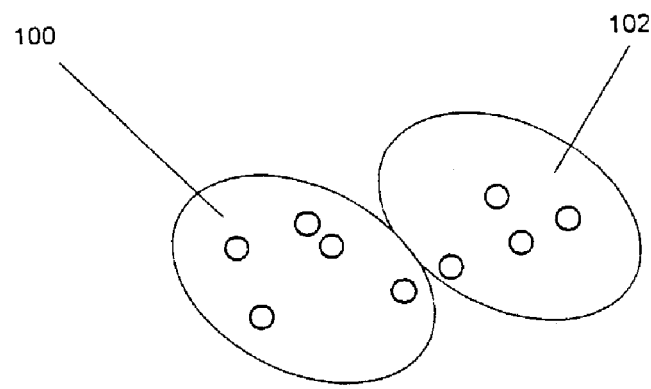
FIGS. 10 and 11 illustrate the aggregation of spatially allocated rule nodes.
Figure 11:
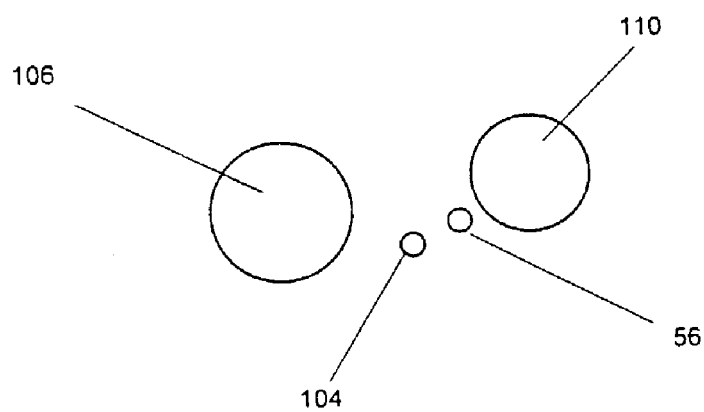

The aggregation of spatially allocated rule nodes is described with reference to FIGS. 10 and 11. Referring to FIG. 10, two distinct sets of rule nodes have been selected and sorted for aggregation, shown generally as 100 and 102 respectively. Referring to FIG. 11, rule node 104 is classified as a guard and is not aggregated. The remaining rule nodes in set 100 are aggregated into new rule 106. Similarly, rule node 108 is not aggregated with remaining aggregated rule nodes in set 102 shown at 110. In accordance with the invention, the sensitivity threshold and error threshold of rule nodes 104 and 108 are decreased to increase the activation threshold of these nodes resulting in aggregated nodes 106 and 110 being activated in preference to guard nodes 104 and 108.

Figure 12:
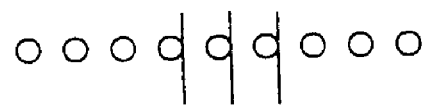
FIGS. 12 and 13 illustrate the aggregation of linearly allocated rule nodes.
Figure 13:

FIGS. 12 and 13 illustrate the same process of aggregation as that described in FIGS. 10 and 11 with the exception that the rule nodes are linearly allocated rather than spatially allocated, as they are in FIGS. 10 and 11.

Aggregation in accordance with the invention is preferably performed after a certain number of examples are presented (parameter $N_{agg}$) over the whole set of rule nodes.

In a further preferred form the system nodes $r_1$ that are not aggregated may decrease their sensitivity threshold $S_1$ and increase their radius $R_1$ with a small coefficient in order for these nodes to have more chances to win the activation competition for the next input data examples and compete with the rest of the nodes.

Through node creation and consecutive aggregation, the preferred neural network module 22 may adjust over time to changes in the data stream and at the same time preserve its generalisation capabilities.

After a certain time (when certain number of data examples have been presented to the system) some neurons and connections may be pruned. Different pruning rules can be applied for a successful pruning of unnecessary nodes and connections. One of them is given below:

IF (Age($r_j$)>OLD)AND(the total activation TA($r_j$) is less than a pruning parameter Pr times Age ($r_j$)) THEN prune rule node $r_j$, where Age($r_j$) is calculated as the number of examples that have been presented to the system after $r_j$ had been first created; OLD is a pre-defined "age" limit; Pr is a pruning parameter in the range [0,1], and the total activation TA($r_j$) is calculated as the number of examples for which $r_j$ has been the correct winning node (or among the m winning nodes in the m-of-n mode of operation).

The above pruning rule requires that the fuzzy concepts of OLD, HIGH, etc. are defined in advance. As a partial case, a crisp value can be used, e.g. a node is OLD if it has existed during the evolving of a system from more than p examples. The pruning rule and the way the values for the pruning parameters are defined, depend on the application task.

Parameters of each rule node may be either kept fixed during the entire operation of the system, or can be adapted or optimised according to the incoming data. Adaptation may be achieved through the analysis of the behaviour of the system and through a feedback connection from the higher level modules. Genetic algorithms and evolutionary programming techniques can also be applied to optimise the structural and functional parameters of the neural network module 22.

In a further preferred form of the invention, a population of s systems is evolved simultaneously, each system having different parameter values. A certain "window" of incoming data is kept and updated for testing the fitness of the individually evolved system based on mean square error fitness function. The best system is selected and "multiplied" through small deviations of the parameter values thus creating the next generation of population. The process is continuous in an unlimited way in time.

In terms of implementing the method and the system in a computer memory, when created, new rule nodes are either spatially or linearly allocated in the computer memory and the actual allocation of nodes could follow one of a number of different strategies as is described below.

Figure 14:
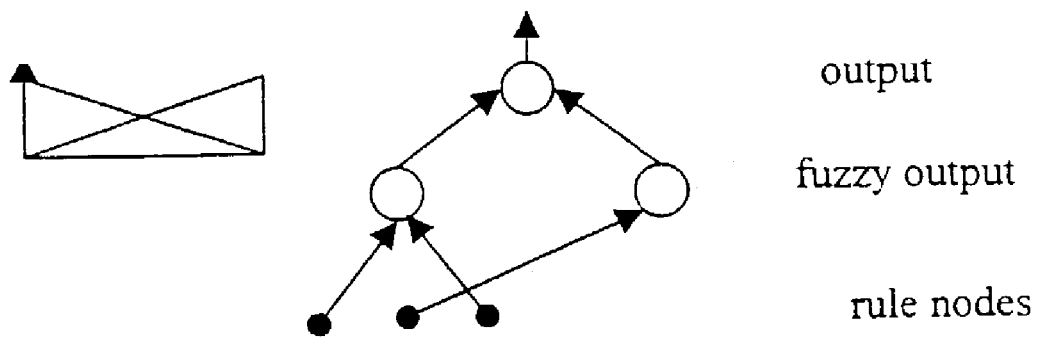
FIGS. 14 to 17 illustrate different allocation strategies for new rule nodes.

One such strategy, as shown in FIG. 14, could be a simple consecutive allocation strategy. Each newly created rule node is allocated in the computer memory next to the previous and to the following rule nodes, in a linear fashion, representing a time order.

Figure 15:
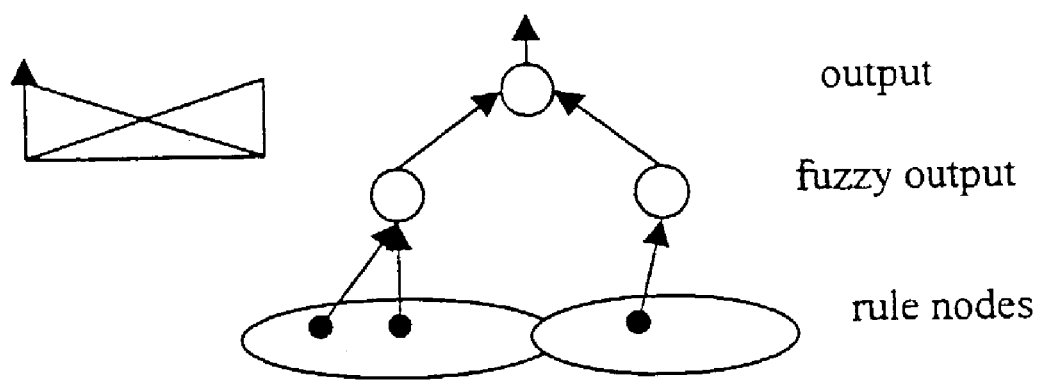

Another possible strategy could be a pre-clustered location as shown in FIG. 15. For each output fuzzy node, there is a pre-defined location in the computer memory where the rule nodes supporting this pre-defined concept are located. At the centre of this area, the nodes that fully support this concept are placed. Every new rule node's location is defined based on the fuzzy output error and the similarity with other nodes. In a nearest activated node insertion strategy, a new rule node is placed nearest to the highly activated node which activation is still less than its sensitivity threshold. The side (left or right) where the new node is inserted, is defined by the highest activation of the two neighbouring nodes.

Figure 16:
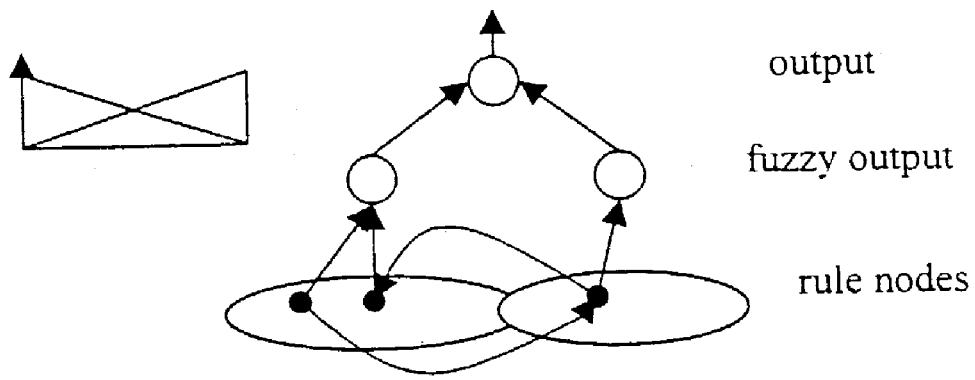

A further strategy could include the pre-clustered location described above further including temporal feedback connections between different parts of the computer memory loci, as shown in FIG. 16. New connections are set that link consecutively activated rule nodes through using the short term memory and the links established through the W3 weight matrix. This will allow the neural network module 22 to repeat a sequence of data points starting from a certain point and not necessarily from the beginning.

Figure 17:
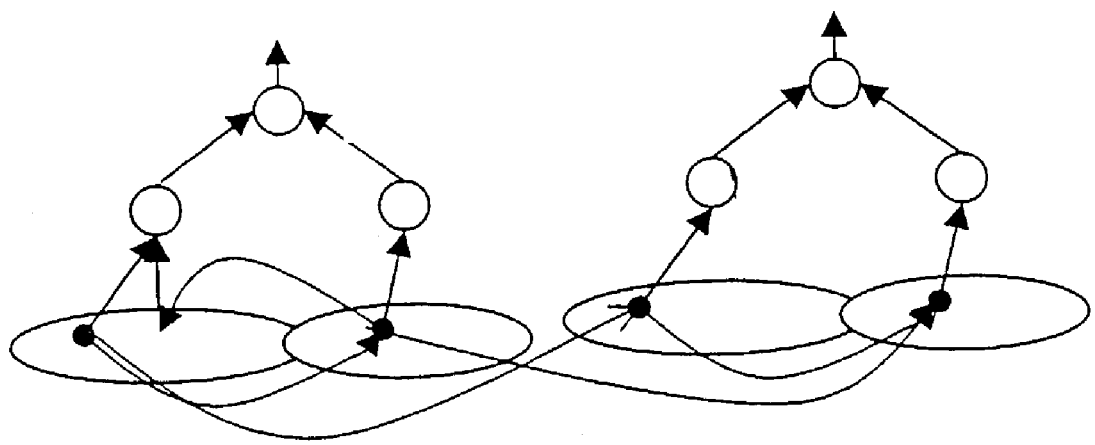

A further strategy could include the additional feature that new connections are established between rule nodes from different neural network modules that become activated simultaneously, as shown in FIG. 17. This feature would enable the system to learn a correlation between conceptually different variables, for example the correlation between speech sound and lip movement.

An important feature of the adaptive learning system and method described above is that learning involves local element tuning. Only one rule node (or a small number, if the system operates in m-of-n mode) will be updated for each data example, or alternatively only one rule node will be created. This speeds up the learning procedure, particularly where linear activation functions are used in the neural network modules. A further advantage is that learning a new data example does not cause forgetting of old examples. Furthermore, new input and new output variables may be added during the learning process, thereby making the adaptive learning system more flexible to accommodate new information without disregarding already learned information.

The use of membership functions, membership degrees and normalised local fuzzy distance enables the system to deal with missing attribute values. In such cases, the membership degrees of all membership functions will be 0.5 indicating that the value, if it existed, may belong equally to them. Preference, in terms of which fuzzy membership functions the missing value may belong to, can also be represented through assigning appropriate membership degrees.

The preferred supervised learning algorithms of the invention enable the system to continually evolve and learn when a new input-output pair of data becomes available. This is known as an active mode of learning. In another mode, passive learning, learning is performed when there is no input pattern presented. Passive learning could be conducted after an initial learning. When passive learning, existing connections that store previously fed input patterns are used as "echo" to reiterate the learning process. This type of learning could be applied in case of a short presentation time of the data, when only a small portion of the data is learned in one pass online mode and then the training is refined through the echo learning method. The stored patterns in the W1 connection weights can be used as input vectors for the system refinement with the W2 patterns indicating what the outputs will be.

Two preferred supervised learning algorithms are described below. Each learning algorithm differs in the weight adjustment formulae.

The first learning algorithm is set out below:

Set initial values for the system parameters: number of membership functions; initial sensitivity thresholds (default $S_j=0.9$); error threshold E; aggregation parameter Nagg–number of consecutive examples after each aggregation is performed; pruning parameters OLD an Pr; a value for m (in m-of-n mode); maximum radius limit Rmax; thresholds $T_1$ and $T_2$ for rule extraction.

```
Set the first rule node r₀ to memorise the first example (x,y);
    W1(r₀)=x_f, and W2(r₀)=y_f;
Loop over presentations of new input-output pairs (x,y)
    {
    Evaluate the local normalised fuzzy distance D between x_f and the existing rule node
    connections W1 (formulae (1))
    Calculate the activation A1 of the rule node layer. Find the closest rule node r_k (or the
    closest m rule nodes in case of m-of-n mode) to the fuzzy input vector x_r for which
    A1(r_k) >= S_k (sensitivity threshold for the node r_k),
    if there is no such a node, create a new rule node for (x_f,y_f)
        else
            Find the activation of the fuzzy output layer A2=W2.A1(1-D(W1,x_r))) and the
            normalised output error Err= || y- y'|| / Nout.
                if Err > E
                    create a new rule node to accommodate the current example (x_f,y_f)
                else
                    Update W1 (r_k) and W2(r_k) according to (2) and (3) (in case of m-of-n
                    system update all the m rule nodes with the highest A1 activation).
```

-continued

```
Apply aggregation procedure of rule nodes after each group of N_agg examples are
presented
Update the values for the rule node r_k parameters S_k, R_k, Age(r_k), TA (r_k).
Prune rule nodes if necessary, as defined by pruning parameters.
Extract rules from the rule nodes {
  }
```

A modified version of the above algorithm is when the number of the winning rule nodes is chosen to be not 1, but m>1 (by default m=3). This mode is called "m-of-n".

The second learning algorithm is different from the first learning algorithm in the weight adjustment formula for W2 as follows:

$$W2(r_j^{(2)})=W2(r_j^{(2)})+l_j.(A2-y_j).A1(r_j^{(2)}) \qquad (11)$$

This means that after the first propagation of the input vector and error Err calculation, if the weights are going to be adjusted, W1 weights are adjusted first using equation (2) above and then the input vector x is propagated again through the already adjusted rule node $r_j$ to its position $r_j^{(2)}$ in the input space, a new error Err=(A2-$y_j$) is calculated and after that the W2 weights of the rule node $r_j$ are adjusted. This is a finer weight adjustment than the adjustment in the first algorithm that may make a difference in learning short sequences, but for learning longer sequences it may not manifest any difference in the results obtained through the simpler and faster first algorithm.

In addition to supervised learning, the system is also preferably arranged to perform unsupervised learning in which it is assumed that there are no desired output values available and the system evolves its rule nodes from the input space. A node allocation is based only on the sensitivity thresholds $S_j$ and on the learning rates $l_j$. If a new data item d activates a certain rule node (or nodes) above the level of its parameter $S_j$, then this rule node (or the one with the highest activation) is adjusted to accommodate the new data item according to equation (2) above, or alternatively a new rule node is created. The unsupervised learning method of the invention is based on the steps described above as part of the supervised learning method when only the input vector x is available for the current input data item d.

Both the supervised and the unsupervised learning methods for the system are based on the same principles of building the W1 layer of connections. Either class of method could be applied on an evolving system so that if there are known output values, the system will use a supervised learning method, otherwise it will apply the unsupervised learning method on the same structure. For example, after having evolved in an unsupervised way, a neural network module from a spoken word of input data, the system may then use data labelled with the appropriate phoneme labels to continue the learning process of this system, now in a supervised mode.

The preferred system may also perform learning from output hints, or through reinforcement learning, in addition to the unsupervised or supervised learning. This is the case when the exact, desired output values do not become known for the purpose of adjusting the W2 connection weights. Instead, fuzzy hints F given in fuzzy linguistic labels that are used in the fuzzy output space may be given as a feedback, e.g. "low output value is the desired one" while the output value produced by the system is "very low". The system then calculates the fuzzy output error Errf=A2-F and then adjusts the connections W2 through formula (3).

The preferred system may also perform inference and have the ability to generalise on new input data. The inference method is part of the learning method when only the input vector x is propagated through the system. The system calculates the winner, or m winners, as follows: a winning rule node r for an input vector x is the node with: (i) the highest activation A1(r) among other rule nodes for which, (ii):

$$D(x, W1(r))<=Rr, \qquad (12)$$

where: D(x, W1(r)) is the fuzzy normalised distance between x and W1(r); Rr is the radius of the rule node r. If there is no rule node that satisfies the condition (ii) for the current input vector x, only condition (i) is used to select the winner.

In a preferred form of the invention with reference to FIG. 3 above, a temporal layer 60 of temporal nodes 62 captures temporal dependencies between consecutive data examples. If the winning rule node at the moment (t-1), to which the input data vector at the moment (t-1) is associated, is $r_{max}^{(t-1)}$ and the winning node at the moment t is $r_{max}^{(t)}$, then a link between the two nodes is established as follows:

$$W3(r_{max}^{(t-1)},r_{max}^{(t)})=W3(r_{max}^{(t-1)},r_{max}^{(t)})+l_3.A1(r_{max}^{(t-1)}).A1(r_{max}^{(t)}) \qquad (13)$$

where A1($r^{(t)}$) denotes the activation of a rule node r at a time moment (t) and $l_3$ defines the degree to which the neural network module 22 associates links between rule nodes that include consecutive data examples. If $l_3$=0, no temporal associations are learned in the structure and the temporal layer 60 is effectively removed from the neural network module 22.

The learned temporal associations could be used to support the activation of rule nodes based on temporal pattern similarity. Here, temporal dependencies are learned through establishing structural links. These dependencies can be further investigated and enhanced through synaptic analysis, at the synaptic memory level, rather than through neuronal activation analysis at the behavioural level. The ratio spatial-similarity/temporal correlation can be balanced for different applications through two parameters $S_s$ and $T_c$, such that the activation of a rule node r for a new data example d=(x,y) is defined through the following vector operations:

$$A1(r)=|1-Ss.D(W1(r),x_j)+Tc.W3(r_{max}^{(t-1)},r)|_{[0,1]} \qquad (14)$$

where $|.|_{[0,1]}$ is bounded operation in the interval [0,1], and $r^{max(t-1)}$ is the winning neuron at the previous time moment. Here temporal connections can be given a higher importance in order to tolerate a higher distance in time for time-dependent input vectors. If $T_c$=0, then temporal links are excluded from the functioning of the system.

The system is arranged to learn a complex chaotic function through online evolving from one pass data propagation. The system is also arranged to learn time series that change their dynamics through time and never repeat same patterns. Time series processes with changing dynamics could be of different origins, for example biological, environmental, industrial processes control, financial. The system could also be used for off-line training and testing similar to other standard neural network techniques.

An example of learning a complex chaotic function is described with reference to FIGS. 18A and 18B. Here, the system is used with the Mackey-Glass chaotic time series data generated through the Mackey-Glass time delay differential equation:

$$\frac{d(x)}{d(t)} = \frac{ax(t-\tau)}{1+x^{10}(t-\tau)} - b \times (t). \tag{15}$$

This series behaves as a chaotic time series for some values of the parameters x (0) and τ. Here, x (0)=1.2, τ=17, a=0.2, b=0.1 and x (t)=0 for t<0. The input-output data for evolving the system from the Mackey-Glass time series data has an input vector [x(t), x(t–6), (t–12), x(t–18)] and the output vector is [x(t+6)]. The task is to predict future values x(t+6) from four points spaced at six time intervals in the past.

For the example, values for the system parameters are initially set as follows:

S=0.92, E=0.08, l=0.005, aggregation threshold is Rmax=0.15 and rule extraction thresholds $T_1=T_2=0.1$. Aggregation is performed after each consecutive group of $N_{agg}$=50 examples is presented.

Figure 18B:
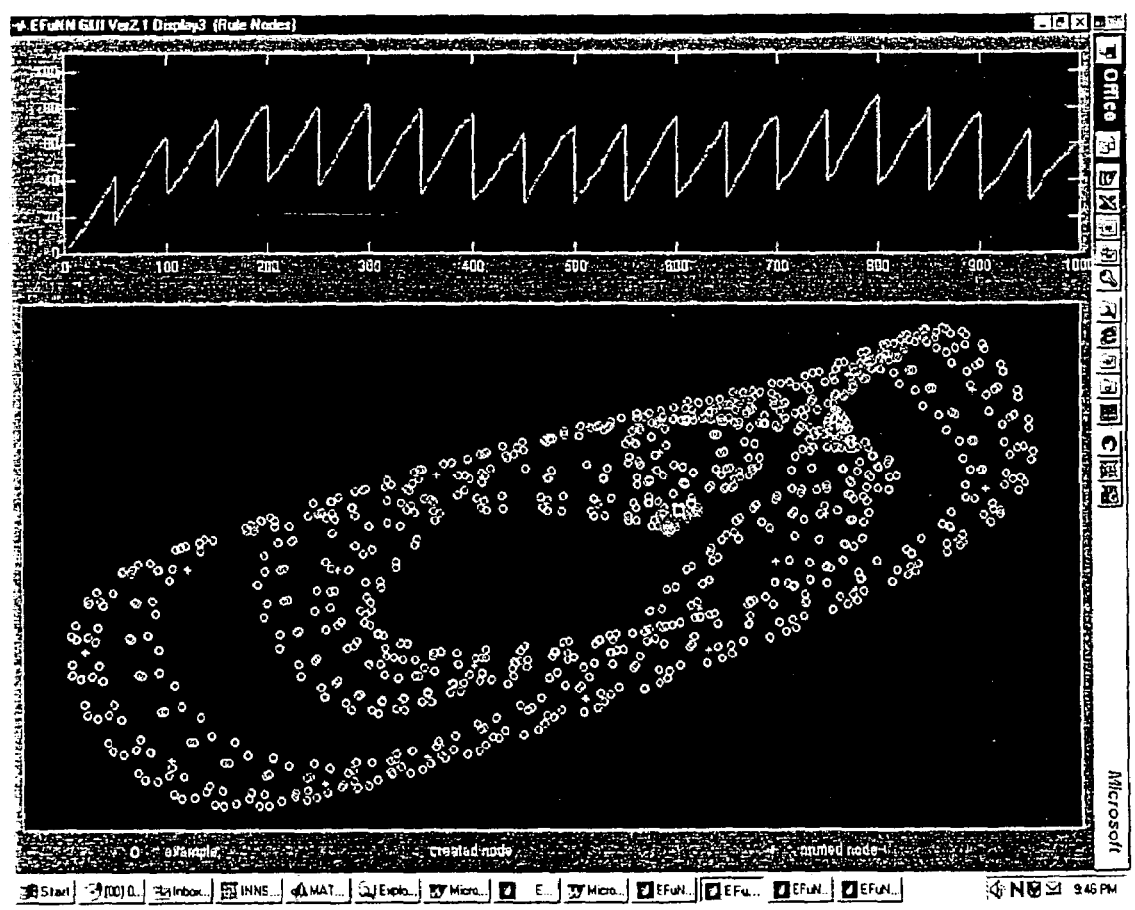

Experimental results of the on-line evolving of the system are shown in FIGS. 18A and 18B. In particular, the desired versus predicted six steps ahead values through one-pass on-line learning, the absolute, the local on-line RMSE (LRMSE) and the local on-line NDEI (LNDEI) error over time as described below, the number of the rule nodes created and aggregated over time, and a plot of the input data vectors shown as circles and the evolved rule nodes, the W1 connection weights shown as crosses, projected in the two-dimensional input space of the first two input variables x(t) and x(t–6). It can be seen from FIGS. 18A and 18B that the number of the rule nodes is optimised after every 50 examples are presented. The rule nodes are located in the input and the output problem spaces so that they represent cluster centres of the input data that have similar output values subject to an error difference E.

The generalisation error of a neural network module on a next new input vector (or vectors) from the input stream calculated through the evolving process is called local on-line generalisation error. The local on-line generalisation error at the moment t for example, when the input vector is x(t) and the calculated by the evolved module output vector is y(t)', is expressed as Err(t)=y(t)–y(t)'. The local on-line root mean square error, and the local on-line non-dimensional error index LNDEI(t) can be calculated at each time moment t as:

$$\text{LRMSE}(t) = \sqrt{(\Sigma_{j=1, 2, \ldots, t}(\text{Err}(i)^2)/t)}; \text{LNDEI}(t) = \text{LRMSE}(t)/\text{std}(y(1):y(t)) \tag{16}$$

where std(y(1):y(t)) is the standard deviation of the output data points from 1 to t.

For the chosen values of the parameters, there were 16 rule nodes evolved each of them represented as one rule. Three of these rules are shown in FIG. 19, namely Rule 1, Rule 2 and Rule 16. These rules and the system inference mechanism define a system that is equivalent to the above equation (16) in terms of the chosen inputs and output variables subject to the calculated error.

As more input data is entered after certain time moment the LRMSE and LNDEI converge to constant values subject to a small error, in the example from FIG. 19—LRMSE=0.043, LNDEI'0.191. Generally speaking, in the case of compact and bounded problem space the error can be made sufficiently small subject to appropriate selection of the parameter values for the system and the initial data stream. In the experiment above the chosen error tolerance was comparatively high, but the resulting system was compact. If the chosen error threshold E was smaller (e.g. 0.05, or 0.02) more rule nodes would have been evolved and better prediction accuracy could have been achieved. Different neural network modules have different optimal parameter values, which depends on the task (e.g. time series prediction, classification).

Figure 20:
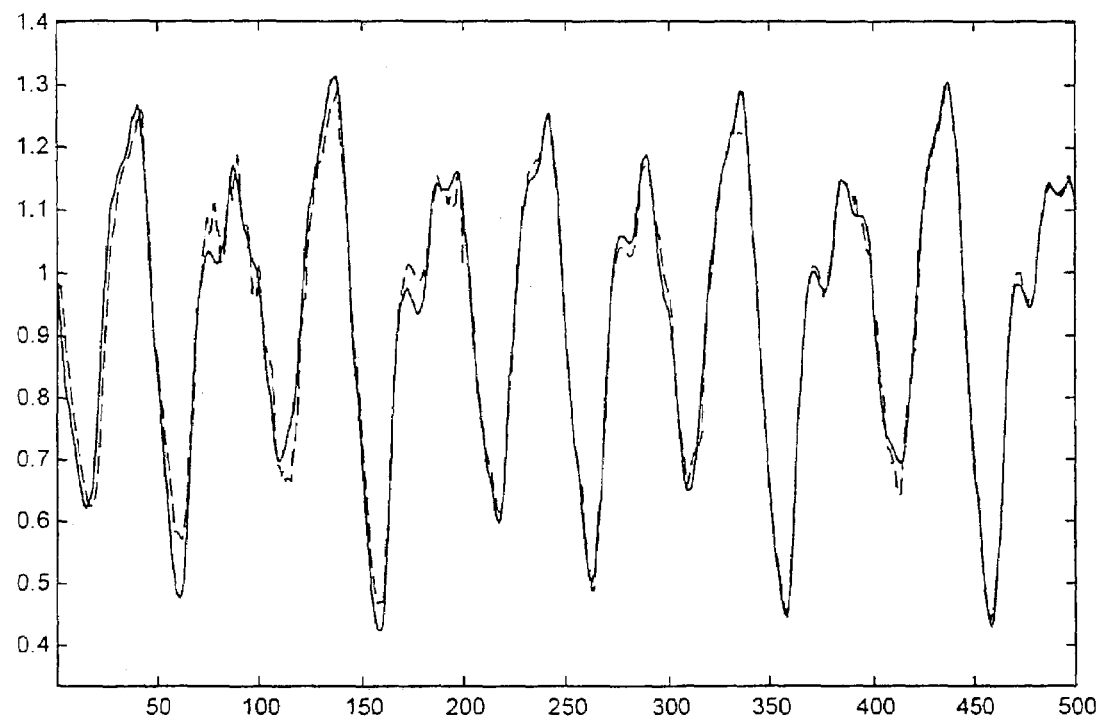
FIGS. 20 and 21 illustrate the system learning from time series data examples.
Figure 21:
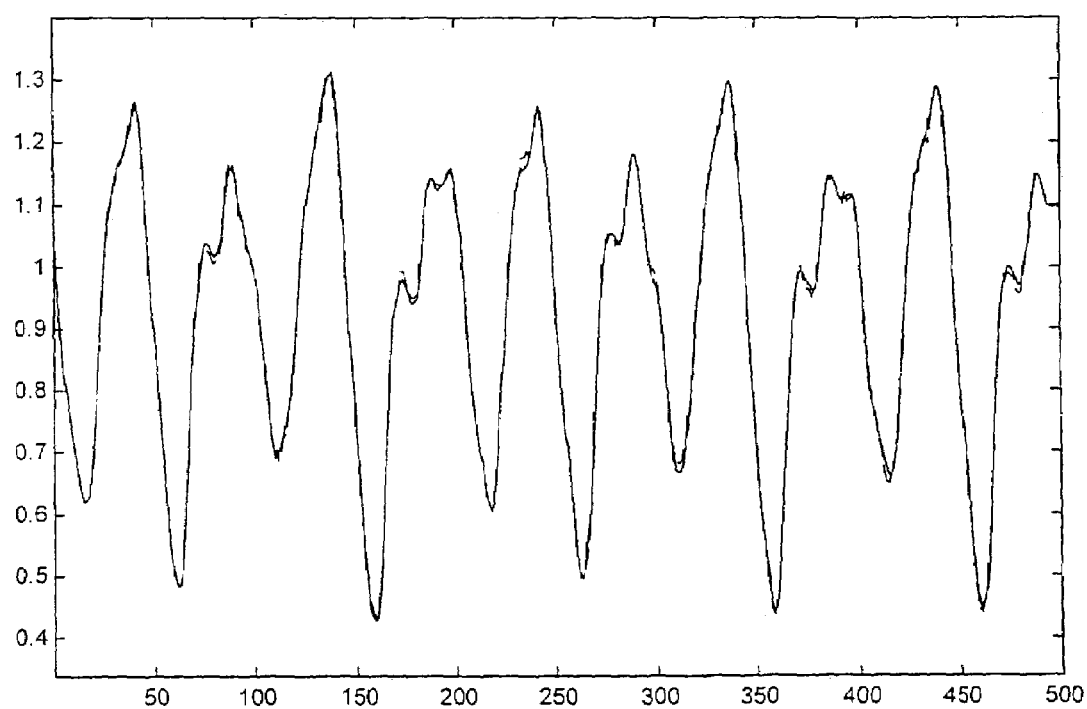

A further example has been conducted in which the system has been used for off-line training and testing. The following parameter values are initially set before the system is evolved, namely MF=5, S=0.92, E=0.02, m=3, l=0.005. The system is evolved on the first 500 data examples from the same Mackey-Glass time series as in the example above for one pass of learning. FIG. 20 shows the desired versus the predicted on-line values of the time-series. After the system is evolved, it is tested for a global generalisation of the second 500 examples. FIG. 21 shows the desired values versus the values predicted by the system in an off-line mode.

In a general case, the global generalisation root mean square error (RMSE) and the non-dimensional error index are evaluated on a set of p new examples from the problem space as follows:

$$\text{RMSE} = \sqrt{(\Sigma_{i=1, 2, \ldots, p}[(y_i-y_i')^2]/p)}; \text{NDEI} = \text{RMSE}/\text{std}(1:p), \tag{17}$$

where std (1:p) is the standard deviation of the data from 1 to p in the test set. The evaluated data in this example RMSE is 0.01 and the NDEI is 0.046. After having evolved the system on a small but representative part of the whole problem space, its global generalisation error is sufficiently minimised.

The system is also tested for on-line test error on the test data while further training on it is performed. The on-line local test error is slightly smaller.

In one experimental application the preferred system can be used for life-long unsupervised learning from a continuous stream of new data. Such is the case of learning new sounds of new languages or new accents unheard before. One experiment is described with reference to FIGS. 22 and 23. The system is presented with the acoustic features of a spoken word "eight" having a phonemic representation of /silence//ei//t//silence/. In the experimental results shown in FIG. 22, three time lags of 26 mel scale coefficient taken from a window of 12 ms of the speech signal, with an overlap of 50%, are used to form 78-element input vectors. The input vectors are plotted over time as shown in FIG. 23.

Each new input vector from the spoken word is either associated with an existing rule node that is modified to accommodate this data, or a new rule node is created. The rule nodes are aggregated at regular intervals which reduces the number of the nodes placed at the centres of the data clusters. After the whole word is presented, the aggregated rule nodes represent the centres of the anticipated phoneme clusters without the concept of phonemes being introduced to the system.

Figure 22:
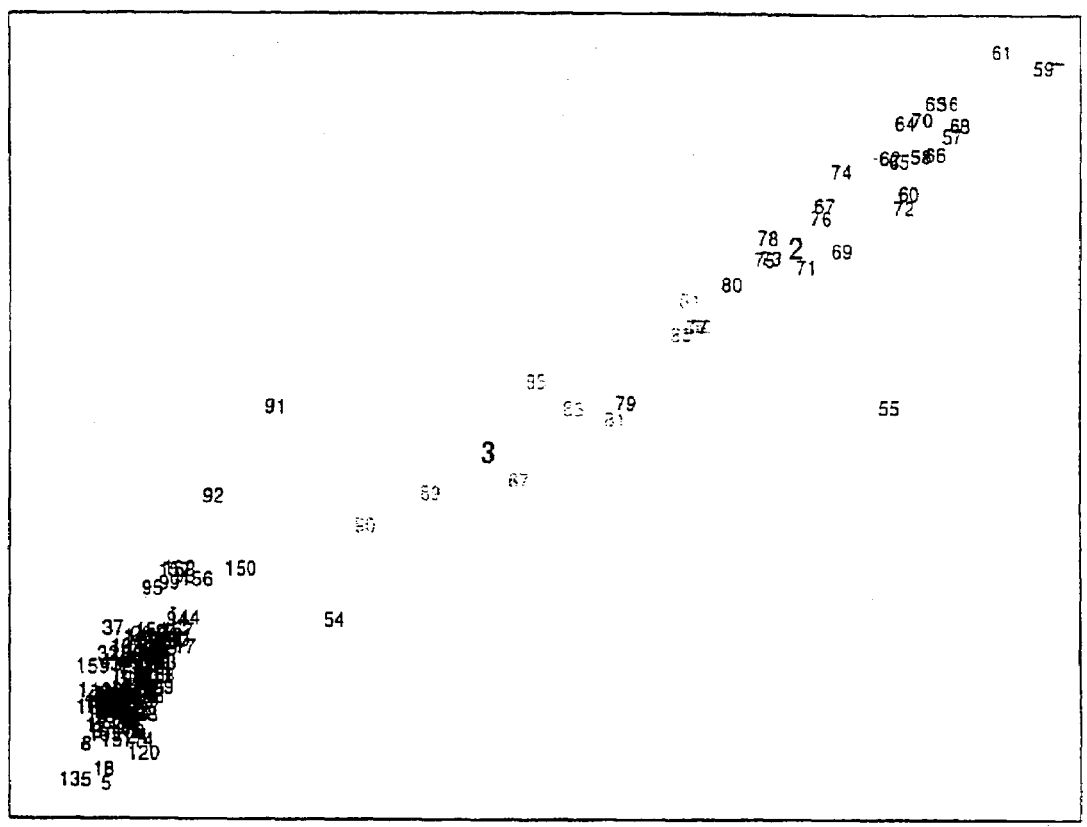
FIGS. 22 and 23 illustrate unsupervised continuous learning by the system.
Figure 23:
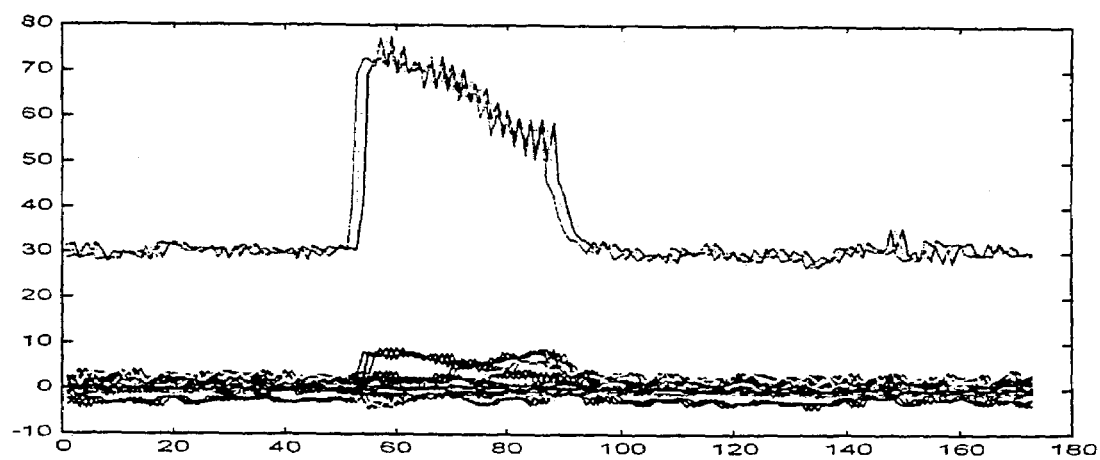

FIGS. 22 and 23 show clearly that three rule nodes were evolved after aggregation that represent the input data. For example, frames 0 to 53 indicated at 120 and frames 96 to 170 indicated at 122 are allocated to rule node 1 which represents the phoneme/silence/. Frames 56 to 78 indicated at 124 are allocated to rule node 2 which represents the phoneme/ei/. Frames 85 to 91 indicated at 126 are allocated to rule node 3 which represents the phoneme/t/. The remaining frames represent transitional states. For example, frames 54 to 55 represent the transition between /silence and /ei/. Frames 79 to 84 represent the transition between /ei/ and /t/. Frames 92 to 96 represent the transition between /t/ and /silence/. These frames are allocated to some of the closest rule nodes in the input space. If a higher sensitivity threshold is used, this would have resulted in additional rule nodes evolved to represent these short transitional sounds.

When further pronunciations of the word "eight" or other words are presented to the unsupervised system, the system refines the phoneme regions and the phoneme rule nodes or creates new phoneme rule nodes. The unsupervised learning method described above permits experimenting with different strategies of learning, namely increased sensitivity over time, decreased sensitivity over time and using forgetting in the process of learning. It also permits experimenting with several languages in a multilingual system.

Figure 24:
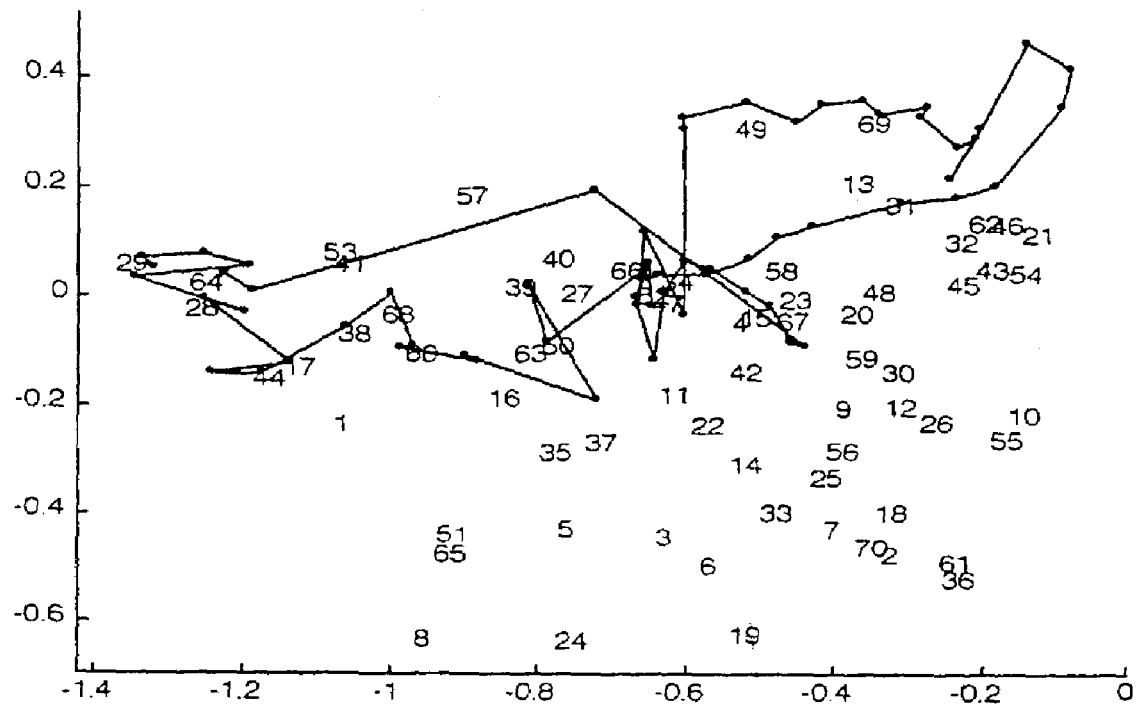
FIG. 24 illustrates evolved rule nodes and the tajectory of a spoken word 'zoo' in the two dimensional space of the first two principal components in a system trained with a mix of spoken words in NZ English and Maori.

In an experimental setting a system is evolved on both spoken words from New Zealand English and spoken words from Maori. Some of the evolved phoneme rule nodes are shared between the acoustical representation of the languages as it is illustrated in FIG. 24 where the evolved rule nodes as well as a trajectory of spoken word 'zoo' are plotted in the 2 dimensional space of the first two principal components of the input acoustic space. The rule nodes in the evolved system represent a compact representation of the acoustic space of the two languages presented to the system. The system can continuously be trained on further words of the two languages or more languages, thus refining the acoustic space representation with the use of the sharing sounds (phonemes) principle.

The system has been subject to an experiment concerned with the task of on-line time series prediction of the Mackey-Glass data. Here the standard CMU benchmark format of the time series is used. The data is generated with $\tau=17$ using a second order Runge-Kutta method with a step size of 0.1, of four inputs, namely $x(t)$, $x(t-6)$, $x(t-12)$ and $x(t-18)$ and one output namely $x(t+85)$. Training data is from t=200 to t=3200 while test data is from t=5000 to t=5500. All 3000 training data sets were used to evolve two types of neural network modules.

For the purposes of the first and second learning algorithms described above, the following initial values of the parameters were chosen: MF=3, S=0.7, E=0.02, m=3, l=0.02, Rmax=0.2, $N_{agg}$=100. The number of the centres and the local on-line LNDEI is calculated and compared with the results for the RAN model as described in Platt, J "A resource allocating network for function interpolation", Neural Computation 3,213-225 (1991) and modifications.

The results are shown in FIG. 25. The two modifications of the system result in a smaller on-line error than the other methods and in a reasonable number of rule nodes. The two learning algorithms are shown as System-su and System-dp.

As the system preferably uses linear equations for calculating the activation of the rule nodes, rather than Gaussian functions and exponential functions as in the RAN model, the present system learning procedure is faster than the learning procedure in the RAN model and its modifications. The system also produces better on-line generalisation, which is a result of more accurate node allocation during the learning process. This is in addition to the advantageous knowledge representation features of the preferred system that includes clustering of the input space, and rule extraction and rule insertion.

The system has also been subject to a further experiment dealing with a classification task on a case study data of spoken digits. The task is recognition of speaker independent pronunciations of English digits from the Otago corpus database (http://kel.otago.ac.nz/hyspeech/corpus/). Seventeen speakers (12 males and 5 females) are used for training and a further 17 speakers (12 males and 5 females) are used for off-line testing. Each speaker utters 30 instances of English digits during a recording session in a quiet room, resulting in clean data, for a total of 510 training and 510 testing utterances. Eight mel frequency scale cepstrum coefficients (MFSCC) and log-energy are used as acoustic features. In order to assess the performance of the system in this application, a comparison with Linear Vector Quantisation (LVQ) is accomplished. Clean training speech is used to train both LVQ and the present system. Office noise is introduced to the test speech data to evaluate the behaviour of the recognition systems in a noisy environment, with a Signal-to-Noise ratio of 10 dB.

The classification off-line test accuracy for the LVQ model and the present system, and also the local on-line test accuracy for the system are evaluated and shown in FIG. 26.

The LVQ model has the following parameter values, namely code-book vectors 396, training iterations 15840. The present system has the following parameter values of one training iteration, 3 MFs, 157 rule nodes, initial values for S=0.9, E=0.1, l=0.01. Maximum radius is Rmax=0.2 and the number of examples for aggregation $N_{agg}$=100.

The results show that the present system with off-line learning and testing on new data performs much better than the LVQ method as shown in FIG. 26. As the present system allows for continuous training on new data, further testing and also training of the system on the test data in an on-line mode leads to a significant improvement of accuracy.

The system has also been subject to a further experiment dealing with a classification task on a bio-informatics case study data obtained from the machine learning database repository at the University of California at Irvine. It contains primate splice-junction gene sequences for the identification of splice site boundaries within these sequences. In eukaryotes the genes that code for proteins are split into coding regions (exons) and noncoding regions (introns) of the DNA sequence at defined boundaries, the so called splice sites. The data set consists of 3190 DNA sequences which are 60 nucleotides long and classified either as an exon-intron boundary (EI), an intron-exon boundary (IE) and non-splice site (N). The system uses 2 MF and a four bit encoding scheme for the bases.

After training the system on existing data the system is able to identify potential splice sites within new sequences. Using a sliding window of 60 bases to cover the entire sequence being examined, the boundaries are identified as EI, IE, or N. A score is given to each boundary identified that represents the likelihood that the identified boundary has been identified correctly. The system can be continuously trained on new known data sequences, thus improving its performance on unknown data sequences. At any time of the functioning of the system knowledge can be extracted from it in the form of semantically meaningful rules that describe important biological relationships. Some of the extracted rules with a rule extraction threshold T1=T2=0.7 are further simplified, formatted and presented in a way that can be interpreted by the user, as shown in FIG. 27. Using different rule extraction thresholds would allow extraction of different sets of rules that have different levels of abstraction, thus allowing for a better understanding of the gene sequences.

The system has also been subject to a further experiment dealing with a classification task on a bio-informatics case study data which is a data set of 72 classification examples for leukemia cancer disease. The data set consists of two classes and a large input space—the expression values of 7,129 genes monitored by Affymatrix arrays (Golub et all). The two types of leukemia are acute myeloid leukemia (AML) and acute lymphoblastic leukemia (ALL).

The task is twofold: 1) Finding a set of genes distinguishing ALL and AML, and 2) Constructing a classifier based on the expression of these genes allowing for new data to be entered to the system once they have been made available. The system accommodates or adapts this data improving the classification results. The system is evolved through one pass training on each consecutive example and testing it on the next one.

During the process of on-line evolving the system learns each example and then attempts to predict the class of the next one. Here the system continually evolves with new examples accommodated, as they become available. At any time of the system operation rules that explain which genes are more closely related to each of the classes can be extracted. FIG. 28 shows two of the extracted rules after the initial 72 examples are learned by the system. The rules are "local" and each of them has the meaning of the dominating rule in a particular cluster of the input space.

The system in an on-line learning mode could be used as building blocks for creating adaptive speech recognition systems that are based on an evolving connectionist framework. Such systems would be able to adapt to new speakers and new accents, and add new words to their dictionaries at any time of their operation.

Possible applications of the invention include adaptive speech recognition in a noisy environment, adaptive spoken language evolving systems, adaptive process control, adaptive robot control, adaptive knowledge based systems for learning genetic information, adaptive agents on the Internet, adaptive systems for on-line decision making on financial and economic data, adaptive automatic vehicle driving systems that learn to navigate in a new environment (cars, helicopters, etc), and classifying bio-infomatic data.

The foregoing describes the invention including preferred forms thereof. Alterations and modifications as will be obvious to those skilled in the art are intended to be incorporated within the scope hereof, as defined by the accompanying claims.

The invention claimed is:

1. A neural network program embodied on a computer-readable medium comprising:
   an input layer comprising one or more input nodes arranged to receive input data;
   a rule base layer comprising one or more rule nodes;
   an output layer comprising one or more output nodes, each rule node in the rule base layer having a minimum activation threshold and each rule node arranged to be activated when input data satisfies the minimum activation threshold of the rule node; and
   an adaptive component arranged to aggregate selected two or more rule nodes in the rule base layer based on the input data.

2. The neural network program as claimed in claim 1, wherein the parameters of the activation threshold of each rule node activated by input data are adjusted based on the input data.

3. The neural network program as claimed in claim 2, wherein the adaptive component is arranged to aggregate two or more rule nodes based on the magnitude of activation when activated by input data.

4. The neural network program as claimed in claim 2, wherein the parameters of activation threshold of each rule node are adjusted based at least partially on new input data.

5. The neural network program as claimed in claim 2, further comprising input data stored in a memory, the parameters of the activation threshold of each rule node arranged to be adjusted based at least partially on the stored input data.

6. The neural network program as claimed in claim 1, wherein each rule node is assigned a magnitude of activation when activated by input data.

7. The neural network program as claimed in claim 1, wherein the adaptive component is arranged to increase the minimum activation threshold of one or more rule nodes not selected for aggregation.

8. The neural network program as claimed in claim 1, wherein the parameters of the activation threshold of each rule node activated by input data are adjusted based on both the input data and desired output data.

9. The neural network program as claimed in claim 1, wherein the adaptive component is arranged to insert new rule nodes into the rule base layer.

10. The neural network program as claimed in claim 1 wherein the adaptive component is arranged to extract rules from the rule base layer.

11. The neural network program as claimed in claim 1, further comprising a fuzzy input layer comprising one or more fuzzy input nodes arranged to transform input node values for use by the rule base layer.

12. The neural network program as claimed in claim 1, further comprising a fuzzy output layer comprising one or more fuzzy output nodes arranged to transform data output from the rule base layer.

13. An adaptive learning program embodied on a computer readable medium comprising more than one neural network program each neural network program comprising:
   an input layer comprising one or more input nodes arranged to receive input data;
   a rule base layer comprising one or more rule nodes, each rule node in the rule base layer having a minimum activation threshold and each rule node arranged to be activated when input data satisfies the minimum activation threshold of the rule node;
   an output layer comprising one or more output nodes; and
   an adaptive component arranged to aggregate selected two or more rule nodes in the rule base layer based on the input data.

14. A neural network module comprising:
   an input layer comprising one or more input nodes arranged to receive input data;
   a rule base layer comprising one or more rule nodes, each rule node having a minimum activation threshold, each rule node configured to be activated where when input data satisfies the minimum activation threshold of the rule node;
   an output layer comprising one or more output nodes; and
   an adaptation component arranged to aggregate selected two or more rule nodes in the rule base layer based on the input data, and to increase the minimum activation threshold of one or more rule nodes not selected for aggregation.

15. The neural network module as claimed in claim 14, wherein the parameters of the activation threshold of each rule node activated by input data are adjusted based on the input data.

16. The neural network module as claimed in claim 14, wherein each rule node is assigned a magnitude of activation when activated by input data.

17. The neural network module as claimed in claim 16, wherein the adaptation component is configured to aggregate two or more rule nodes based on the magnitude of activation when activated by input data.

18. The neural network module as claimed in claim 14, wherein the parameters of the activation threshold of each rule node activated by input data are adjusted based on both the input data and desired output data.

19. The neural network module as claimed in claim 14, wherein the adaptation component is configured to insert new rule nodes into the rule base layer.

20. The neural network module as claimed in claim 14, wherein the adaptation component is configured to extract rules from the rule base layer.

21. The neural network module as claimed in claim 14, wherein the parameters of the activation threshold of each rule node are adjusted based at least partially on new input data.

22. The neural network module as claimed in claim 14, further comprising a memory in which is stored input data, wherein the parameters of the activation threshold of each rule node are adjusted based at least partially on the stored input data.

23. The neural network module as claimed in claim 14, further comprising a fuzzy input layer comprising one or more fuzzy input nodes arranged to transform input node values for use by the rule base layer.

24. The neural network module as claimed in claim 14, further comprising a fuzzy output layer comprising one or more fuzzy output nodes arranged to transform data output from the rule base layer.

25. An adaptive learning system comprising more than one neural network module, each neural network module comprising:
an input layer comprising one ore more input nodes arranged to receive input data;
a rule base layer comprising one or more rule nodes, each rule node having a minimum activation threshold and each rule node configured to be activated when input data satisfies the minimum activation threshold of the rule node;
an output layer comprising one or more output nodes; and
an adaptation component arranged to aggregate selected two or more rule nodes in the rule base layer based on the input data, and to increase the minimum activation threshold of one or more rule nodes not selected for aggregation.

26. A method of implementing a neural network module comprising the steps of:
maintaining in computer memory an input layer comprising one or more input nodes to receive input data;
maintaining in computer memory a rule base layer comprising one or more rule nodes;
assigning a minimum activation threshold to each rule node in the rule base layer, each rule node being activated when input data satisfies the minimum activation threshold of the rule node;
maintaining in computer memory an output layer comprising one or more output nodes;
aggregating selected two or more rule nodes in the rule base layer based on the input data; and
increasing the minimum activation threshold of one or more rule nodes not selected for aggregation.

27. The method of implementing a neural network module as claimed in claim 26, further comprising the step of adjusting the parameters of the activation threshold of each rule activated by input based on the input data.

28. The method of implementing a neural network module as claimed in claim 26, further comprising the step of assigning to each rule node a magnitude of activation when activated by input data.

29. The method of implementing a neural network module as claimed in claim 26, further comprising the step of aggregating two or more rule nodes based on the magnitude of activation when activated by input data.

30. The method of implementing a neural network module as claimed in claim 26, further comprising the step of adjusting the parameters of the activation threshold of each rule node activated by input data based on both the input data and desired output data.

31. The method of implementing a neural network module as claimed in claim 26, further comprising the step of inserting new rule nodes into the rule base layer.

32. The method of implementing a neural network module as claimed in claim 26, further comprising the step of extracting rules from the rule base layer.

33. The method of implementing a neural network module as claimed in claim 26, further comprising the step of adjusting the parameters of the activation threshold of each rule node based at least partially on new input data.

34. The method of implementing a neural network module as claimed in claim 26, further comprising the steps of maintaining in computer memory input data; and adjusting the parameters of activation threshold of each rule node based at least partially on the stored input data.

35. The method of implementing a neural network module as claimed in claim 26, further comprising the step of maintaining in computer memory a fuzzy input layer comprising one or more fuzzy input nodes to transform input node values for use by the rule base layer.

36. The method of implementing a neural network module as claimed in claim 26, further comprising the steps of maintaining in computer memory a fuzzy output layer comprising one or more fuzzy output nodes to transform data output from the rule base layer.

* * * * *

UNITED STATES PATENT AND TRADEMARK OFFICE
CERTIFICATE OF CORRECTION

PATENT NO. : 7,089,217 B2  Page 1 of 1
APPLICATION NO. : 10/257214
DATED : August 8, 2006
INVENTOR(S) : Nikola K. Kasabov It is certified that error appears in the above-identified patent and that said Letters Patent is hereby corrected as shown below:

Claim 14, col. 18, line 59, delete "where" after -- activated --.

Claim 25, col. 19, line 42, "ore" should read -- or --.

Signed and Sealed this

Fifth Day of August, 2008

JON W. DUDAS
*Director of the United States Patent and Trademark Office*